United States Patent
Das et al.

(10) Patent No.: US 12,277,376 B2
(45) Date of Patent: *Apr. 15, 2025

(54) RAIL POWER DENSITY AWARE STANDARD CELL PLACEMENT FOR INTEGRATED CIRCUITS

(71) Applicant: NVIDIA Corporation, Santa Clara, CA (US)

(72) Inventors: Shaurakar Das, San Jose, CA (US); Haoxing Ren, Austin, TX (US); Santosh Santosh, Los Gatos, CA (US); SeshasaiJyothi Kolli, San Jose, CA (US); Muhammad Arif Mirza, Austin, TX (US); Sreedhar Pratty, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,355

(22) Filed: Mar. 14, 2024

(65) Prior Publication Data
US 2024/0256753 A1   Aug. 1, 2024

Related U.S. Application Data

(63) Continuation of application No. 17/505,374, filed on Oct. 19, 2021, now Pat. No. 11,972,188.

(51) Int. Cl.
*G06F 30/392* (2020.01)
*G06F 30/398* (2020.01)
*H10D 89/10* (2025.01)

(52) U.S. Cl.
CPC .......... *G06F 30/392* (2020.01); *G06F 30/398* (2020.01); *H10D 89/10* (2025.01)

(58) Field of Classification Search
CPC .... G06F 30/392; G06F 30/394; G06F 30/398; G06F 2119/06; G06F 2119/12; H01L 27/0207; H01L 2027/11881
(Continued)

(56) References Cited

U.S. PATENT DOCUMENTS

| | | | |
|---|---|---|---|
| 2015/0302128 A1* | 10/2015 | Katta | G06F 30/392 716/120 |
| 2022/0050952 A1* | 2/2022 | Chang | G06F 30/398 |

OTHER PUBLICATIONS

Heo, S.I., et al., "Detailed Placement of IR Drop Mitigation by Power Staple Insertion in Sub-10nm VLSI," 2019 Design, Automation & Test in Europe Conference and Exhibition, Florence, Italy, pp. 830-835.

(Continued)

*Primary Examiner* — Paul Dinh
(74) *Attorney, Agent, or Firm* — Leydig, Voit & Mayer, Ltd.

(57) ABSTRACT

To ensure proper operation (e.g., speed and/or function) of standard cells fabricated within an integrated circuit a minimum potential difference between the high and low power supply rails needs to be maintained. IR drop refers to a reduction in the potential difference between the power supply rails and is caused when the switching activity of cells that share a power supply rail is greater than can be provided at a particular time. Before fabrication, placement of the cells is reorganized within bounding box regions. Power density across the power rails within each bounding box is normalized based on spatial and temporal power density characteristics of each cell. The reorganization is IR aware and has minimal impact on timing and IR drop is mitigated because distributing current consumption between the supply rails reduces current spikes and IR drops.

23 Claims, 15 Drawing Sheets

(58) Field of Classification Search
USPC .......................................................... 716/120
See application file for complete search history.

(56) References Cited

OTHER PUBLICATIONS

Chhabria, V.A., et al., "MAVIREC: ML-Aided Vectored IR-DropEstimation and Classification," ArXiv, abs/2012.10597, 2020.

Mattii, D.M., et al., "IR-drop aware Design & technology co-optimization for N5 node with different device and cell height options," 2017 IEEE/ACM International Conference on Computer-Aided Design (ICCAD), 2017, pp. 89-94.

Kahng, A.B., et al., "Supply voltage degradation aware analytical placement," 2005 International Conference on Computer Design, 2005, pp. 437-443.

Chuang, P., et al., "Voltage-Drop Aware Analytical Placement by Global Power Spreading for Mixed-Size Circuit Designs," in IEEE Transactions on Computer-Aided Design of Integrated Circuits and Systems, vol. 30, No. 11, pp. 1649-1662, Nov. 2011.

Bhamidipati, L., et al., "A Power Delivery Network and Cell Placement Aware IR-Drop Mitigation Technique: Harvesting Unused Timing Slacks to Schedule Useful Skews," 2017IEEE Computer Society Annual Symposium on VLSI (ISVLSI), 2017, pp. 272-277.

Mjayakumar, V.C., et al., "An Efficient Method for Clock Skew Scheduling to Reduce Peak Current," 2016 29th International Conference on VLSI Design and 2016 15th International Conference on Embedded Systems (VLSID), 2016, pp. 505-510.

Mukherjee, A., et al., "Retiming and clock scheduling to minimize simultaneous switching," IEEE International SOC Conference, 2004. Proceedings., 2004, pp. 259-262.

Huang, X., et al., "Dynamic IR-Drop ECO Optimization by Cell Movement with Current Waveform Staggering and Machine Learning Guidance," 2020 IEEE/ACM International Conference On Computer Aided Design (ICCAD), 2020, pp. 1-9.

Lin, H., et al., "Automatic IR-Drop ECO Using Machine Learning," 2020 IEEE International Test Conference in Asia (ITC-Asia), 2020, pp. 7-12.

Li, S., et al., "Mixed integer programming models for detailed placement," In Proceedings of the 2012 ACM international symposium on International Symposium on Physical Design (ISPD '12), Association for Computing Machinery, New York, NY, USA, 87-94.

Achterberg, T., "SCIP: Solving constraint integer programs," Mathematical Programming Computation. 1., pp. 1-41.

U.S. Appl. No. 17/505,374, filed Oct. 19, 2021, is now issued U.S. Pat. No. 11,972,188.

* cited by examiner

RAIL POWER DENSITY AWARE STANDARD CELL PLACEMENT FOR INTEGRATED CIRCUITS

CLAIM OF PRIORITY

This application claims the benefit of issued U.S. Pat. No. 11,972,188 titled "Rail Power Density Aware Standard Cell Placement For Integrated Circuits," filed Oct. 19, 2021, the entire contents of which is incorporated herein by reference.

BACKGROUND

To ensure proper operation (e.g., speed and/or function) of standard cells fabricated within an integrated circuit, a minimum potential difference between the high and low power supply rails needs to be maintained. IR drop refers to a reduction in the potential difference and is caused when the switching activity of cells that share a power supply rail is greater than can be provided at a particular time.

During placement of the standard cells, before fabrication of the integrated circuit, techniques are used to mitigate IR drop. Conventional solutions to mitigate IR drop are cell downsizing that reduces the size of cells where IR drop violations are detected. Another conventional solution is to add power staples to provide more connections between adjacent power supply rails and reduce resistance. Cell padding is another conventional solution that requires buffer areas around cells that have high switching activity, so that other cells cannot be placed near the high switching activity cells. While mitigating IR drop in some areas, these conventional solutions fail to solve a robust constraint-based mathematical representation of operating behavior, and therefore may cause IR drop vulnerability, specifically timing pushout in other areas. There is a need for addressing these issues and/or other issues associated with the prior art.

SUMMARY

Embodiments of the present disclosure relate to rail power density aware standard cell placement for integrated circuits. Systems and methods are disclosed that reorganize or shuffle standard cell placement within bounding box regions of an integrated circuit to normalize the power density for supply rails within each region. The reorganization has minimal impact on timing while mitigating IR drop. The IR aware placement based on the power densities distributes the current consumption between the supply rails, reducing current spikes and IR drops.

Conventional solutions to mitigate IR drop are cell downsizing, adding power staples, and/or requiring buffering areas around cells that have high switching activity. While mitigating IR drop in some areas, these conventional solutions fail to solve a robust constraint-based mathematical representation of operating behavior, and therefore may cause IR drop vulnerability, specifically timing pushout in other areas.

In contrast to conventional systems, such as those described above, reorganizing standard cell placement within bounding box regions of an integrated circuit layout has minimal impact on timing while mitigating IR drop. A rail power density aware placement technique distributes the current consumption between the supply rails within each bounding box region, reducing current spikes and IR drops.

A method, computer readable medium, and system are disclosed for rail power density aware standard cell placement for integrated circuits. In an embodiment, power density values are obtained for a plurality of cells in an initial cell placement for an integrated circuit layout, where the initial cell placement is subdivided into multiple regions, and where at least a first region of the multiple regions includes multiple power supply rails and a first portion of the cells in the plurality of cells in the initial cell placement. A per-rail power density value is computed for each power supply rail within the first region based on the power density values of the first portion of the cells. For each of a plurality of cell placements of the first portion of the cells, an objective function is evaluated based on the per-rail power density values to generate a result value and a cell placement of the plurality of cell placements is selected, in response to the result values. In an embodiment, the result value for the selected cell placement is a minimum value compared with the result values for other cell placements in the plurality of cell placements.

BRIEF DESCRIPTION OF THE DRAWINGS

The present systems and methods for rail power density aware standard cell placement for integrated circuits are described in detail below with reference to the attached drawing figures, wherein.

DETAILED DESCRIPTION

Systems and methods are disclosed related to rail power density aware standard cell placement for integrated circuits. In the context of the following description, the power density corresponds with the consumed current or maximum current spike for each supply rail and/or standard cell. To ensure proper operation (e.g., speed and/or function) of standard cells fabricated within an integrated circuit, a minimum potential difference between the high and low power supply rails needs to be maintained. The minimum potential difference ensures that capacitors fabricated within each standard cell circuit are charging and discharging in an expected time to meet timing requirements. As the fabrication technology dimensions shrink, the capacitor values increase and it is difficult to maintain the minimum potential difference.

IR drop refers to a reduction in the potential difference between the power supply rails and is caused when the switching activity of cells that share a power supply rail is greater than can be provided at a particular time. Before fabrication, placement of the cells within bounding box regions is reorganized. Power density across the power rails within each bounding box is normalized based on spatial and temporal power density characteristics of each cell. A robust constraint-based mathematical representation of operating behavior is applied to reorganize the cells within each bounding box region. The reorganization is rail power density aware and has minimal impact on timing and IR drop is mitigated because more evenly distributing the current consumption between the supply rails reduces current spikes. In contrast with conventional solutions intended to mitigate IR drop, it is not necessary to downsize cells, add power staples, and/or require buffering areas.

Figure 1A:
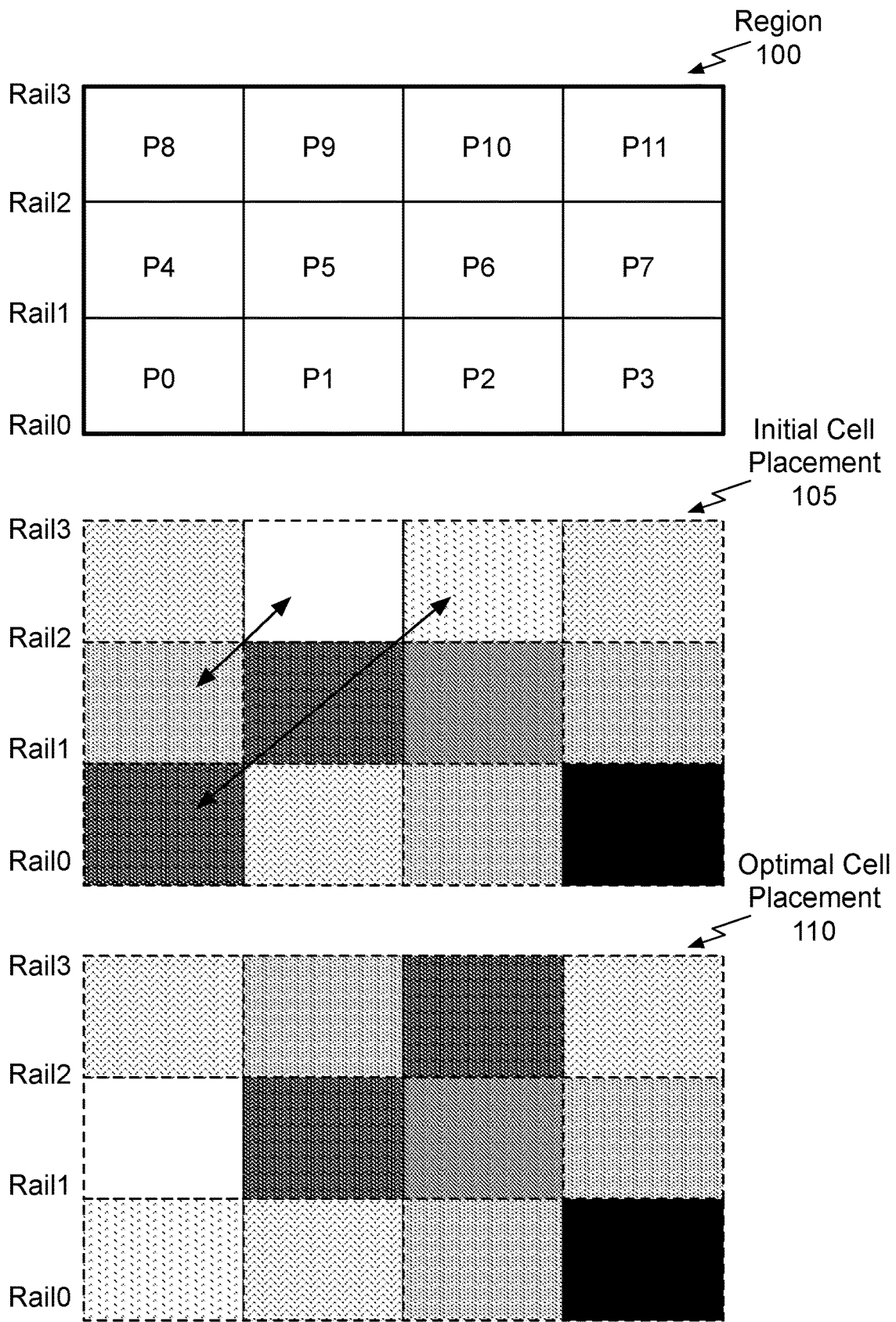
FIG. 1A illustrates a region with cell placement positions, an initial cell placement, and an optimal cell placement, in accordance with an embodiment.

FIG. 1A illustrates a region 100 with cell placement positions, an initial cell placement 105, and an optimal cell placement 110, in accordance with an embodiment. The initial cell placement for an integrated circuit is divided into multiple bounding boxes, where the region 100 comprises one of the multiple bounding boxes. The region 100 includes twelve cell placement positions P0-P11, where cells placed in positions P8-P11 are coupled to rail 3 and rail 2, providing the VDD and VSS power supplies, respectively (or vise versa). Cells placed in positions P4-P7 are coupled to rail 2 and rail 1, providing the VSS and VDD power supplies, respectively. Cells placed in positions P0-P3 are coupled to rail 1 and rail 0, providing the VDD and VSS power supplies, respectively.

The initial cell placement 105 includes twelve cells each placed at a different position within the region 100, where darker shading is associated with cells having higher power density compared with lighter shading. The power density (e.g., energy consumed) for each cell is estimated based on operating simulations and is used to calculate the power density for each rail. The cells in the initial cell placement 105 may be reorganized to balance the power density between the rails. For example, arrows in initial cell placement 105 indicate cells that are spatially swapped to produce the power density aware placement shown in the optimal cell placement 110. Swapping the cell at position P0 with the cell at position P10 reduces the power density for rail 0 and rail 1. Swapping the cell at position P4 with the cell at position P9 further reduces the power density for rail 1. The reorganization of the initial cell placement 105 to produce the optimal cell placement 110 reduces the per-rail power density for rail 0 and rail 1 while increasing the per-rail power density for rails 2 and 3 so that the total power density within the region 100 is more evenly distributed amongst the rails. The maximum power density for any one of the rails is also reduced.

The example shown in FIG. 1A assumes that the cell power density estimated for each cell is constant and does not vary over time. In operation, different cells may be switching at different times and may therefore have peak currents at different time slices within a timing window (e.g., clock cycle). A more optimized power density aware placement may be achieved by considering not only spatial properties, but also temporal properties of the cells. An objective function may be computed based on the per-time slice power densities for the rails within the bounding box.

Per-time slice power densities may be computed for each rail by summing the power density for each cell that is coupled to the rail and is active during the time slice. Once the power density is computed for each time slice, the maximum per-time slice power density is selected as the power density for the rail. The power densities for the rails may be summed to produce the power density for the region. The cost (objective) equals the region power density summed with the maximum of the per-rail power densities (optionally scaled by a tuning parameter). The objective function may be computed for all of the possible cell placements and the placement for which the objective function is a minimum value is the optimal solution. However, in some embodiments, the optimal solution is subject to rail power constraints. Additionally, in some embodiments, the optimal solution is subject to cell placement and/or cell site constraints.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
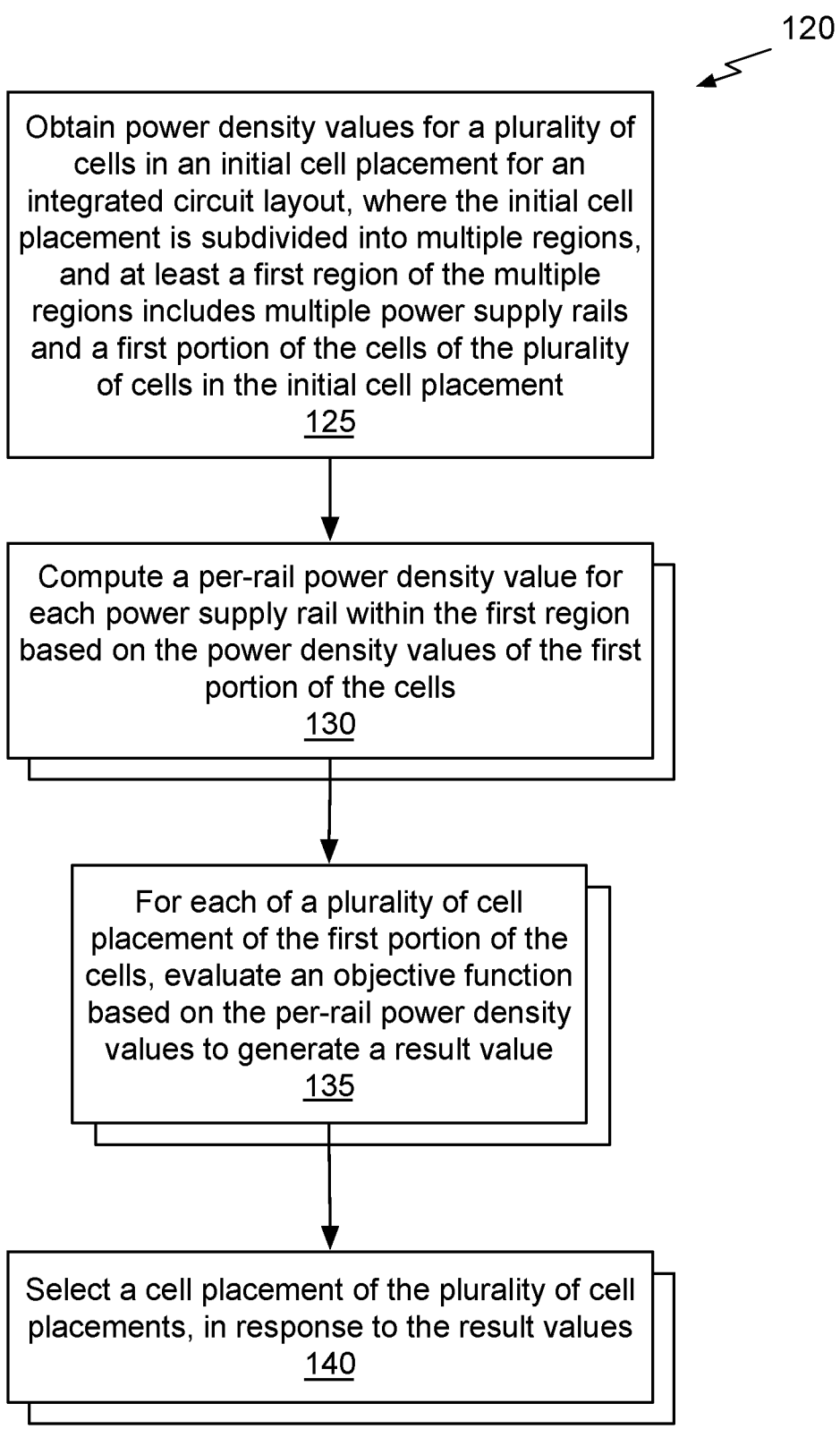
FIG. 1B illustrates a flowchart of a method for rail power density aware standard cell placement, in accordance with an embodiment.

FIG. 1B illustrates a flowchart of a method 120 for rail power density aware standard cell placement, in accordance with an embodiment. Each block of method 120, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. The method 120 may be executed by any one system, or any combination of systems, including, but not limited to, those described herein. Furthermore, persons of ordinary skill in the art will understand that any system that performs method 120 is within the scope and spirit of embodiments of the present disclosure.

At step 125, power density values are obtained for a plurality of cells in an initial cell placement for an integrated circuit layout, where the initial cell placement is subdivided into multiple regions, and where at least a first region of the multiple regions includes multiple power supply rails and a first portion of the cells of the plurality of cells in the initial cell placement. In an embodiment, obtaining the power density values comprises computing the power density value for each cell in the first portion of the cells during a timing window as a function of an input slew rate and an output capacitance of the cell.

At step 130, a per-rail power density value is computed for each power supply rail within the first region based on the power density values of the first portion of the cells. Step 130 may be performed in parallel for at least one additional region of the multiple regions to produce per-rail power density values for the at least one additional region. In an embodiment, at least one cell in the first portion of the cells has a fixed placement within the first region of the multiple regions. In an embodiment, the first portion of the cells includes cells of at least two sizes.

In an embodiment, computing the per-rail power density value for each supply rail within the first region comprises summing the power density values for the cells in the first portion of the cells that are coupled to the supply rail. In an embodiment, computing the per-rail power density value for each supply rail within the first region comprises: for each time slice within a timing window, computing a per-time slice power density as a sum of the power density value for the cells in the first portion of the cells that are active (e.g., switching) during the time slice; and selecting the per-rail power density value as a maximum value of the per-time slice power density values. In an embodiment, a maximum per-rail power density value is selected as a maximum of the per-time slice power density values.

At step 135, an objective function is evaluated based on the per-rail power density values for the first region for multiple cell placements of the first portion of the cells. Step 135 may be performed in parallel for different regions to produce multiple cell placements for each region. In an embodiment, the objective function is a sum of the per-rail power density values for the power supply rails within the first region. In an embodiment, the objective function is a sum of the maximum per-rail power density value scaled by a (programmable) tuning parameter and a sum of the per-rail power density values for the power supply rails within the first region. In an embodiment, the objective function is constrained so that each cell in the first portion of the cells includes only one site within the first region and each site includes no more than one cell in the first portion of the cells.

At step 140, for each of a plurality of cell placements of the first portion of the cells, an ojective function is evaluated based on the per-rail power density values to generate a result value. A cell placement of the plurality of cell placements is selected, in response to the result values. In an embodiment, the result value for the selected cell placement is a minimum value compared with the result values for other cell placements in the plurality of cell placements. In an embodiment, the result value for the selected cell placement is lower compared with the result value of the initial cell placement. Step 140 may be performed in parallel for different regions to select a cell placement for each region. Parallel cell placement optimization may be executed on a multi-threaded processor by assigning a different thread to perform the method 120 for different regions. Parallel execution may reduce the execution time for the method 120 significantly and is particularly effective because power density is a localized problem. However, parallel execution is most efficient when each region is optimized independently. In other words, dependencies between adjacent regions should be minimized or eliminated.

Figure 1C:
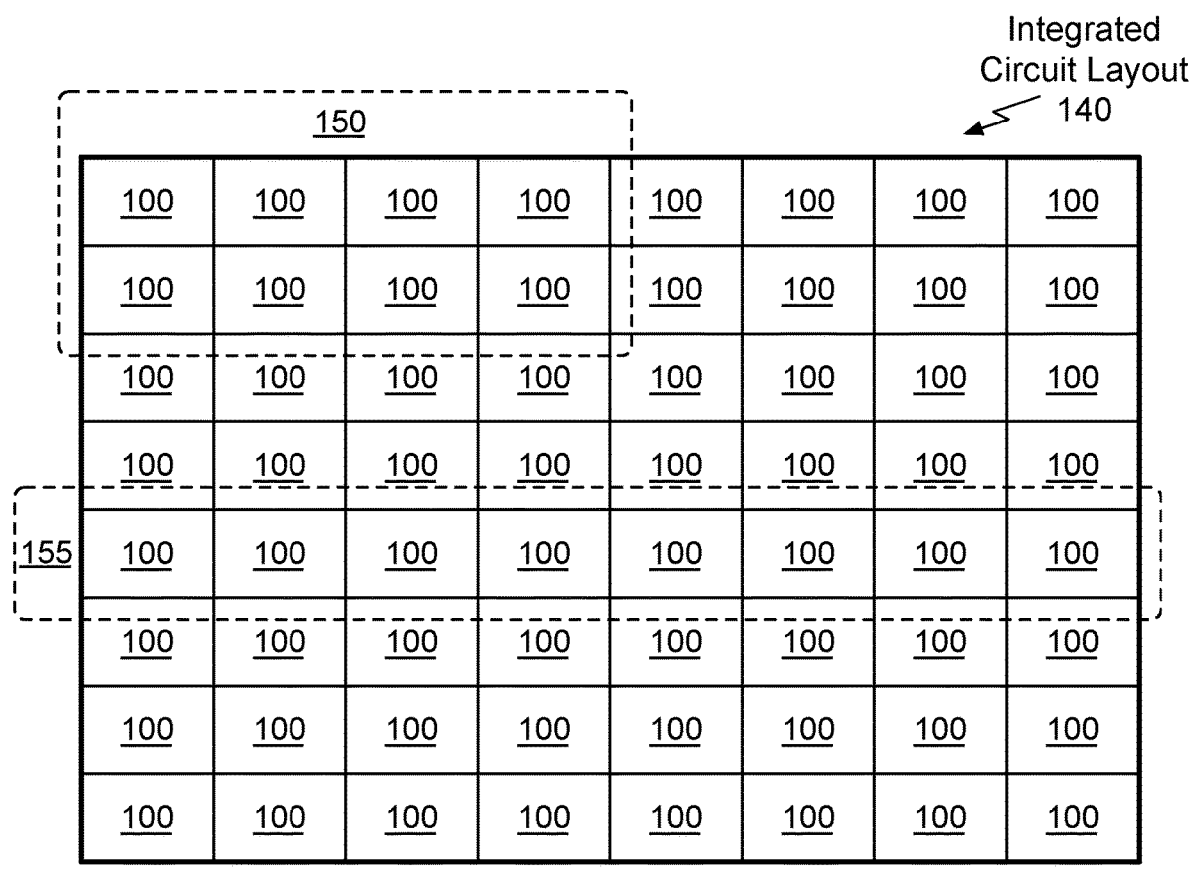
FIG. 1C illustrates an integrated circuit layout partitioned into regions and an individual region, in accordance with an embodiment.
Figure 1C:
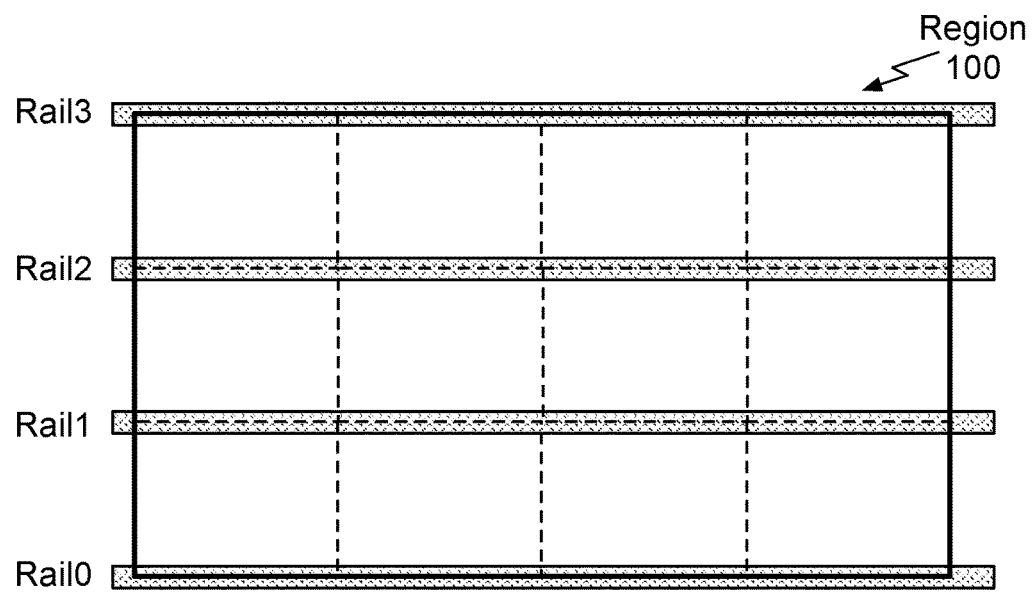

FIG. 1C illustrates an integrated circuit layout 140 partitioned into regions 100 and an individual region 100, in accordance with an embodiment. Optimal cell placements may be identified for multiple regions 100 in parallel. For example, the regions 100 may be grouped into multiple regions 150 or 155 for optimal cell placement in parallel. The region 100 includes four different supply rails. Regions may be larger or smaller compared with the region 100, including more or fewer supply rails. Regions may also be taller, shorter, wider, and/or narrower compared with the region 100. In general, a region should include at least three supply rails to provide a variety of cell placements from which an optimal cell placement may be identified. Also, the integrated circuit layout 140 may be partitioned into regions of different sizes and/or aspect ratios. For example, in an embodiment, the multiple regions 150 or 155 may instead each comprise a single larger region.

Figure 1D:
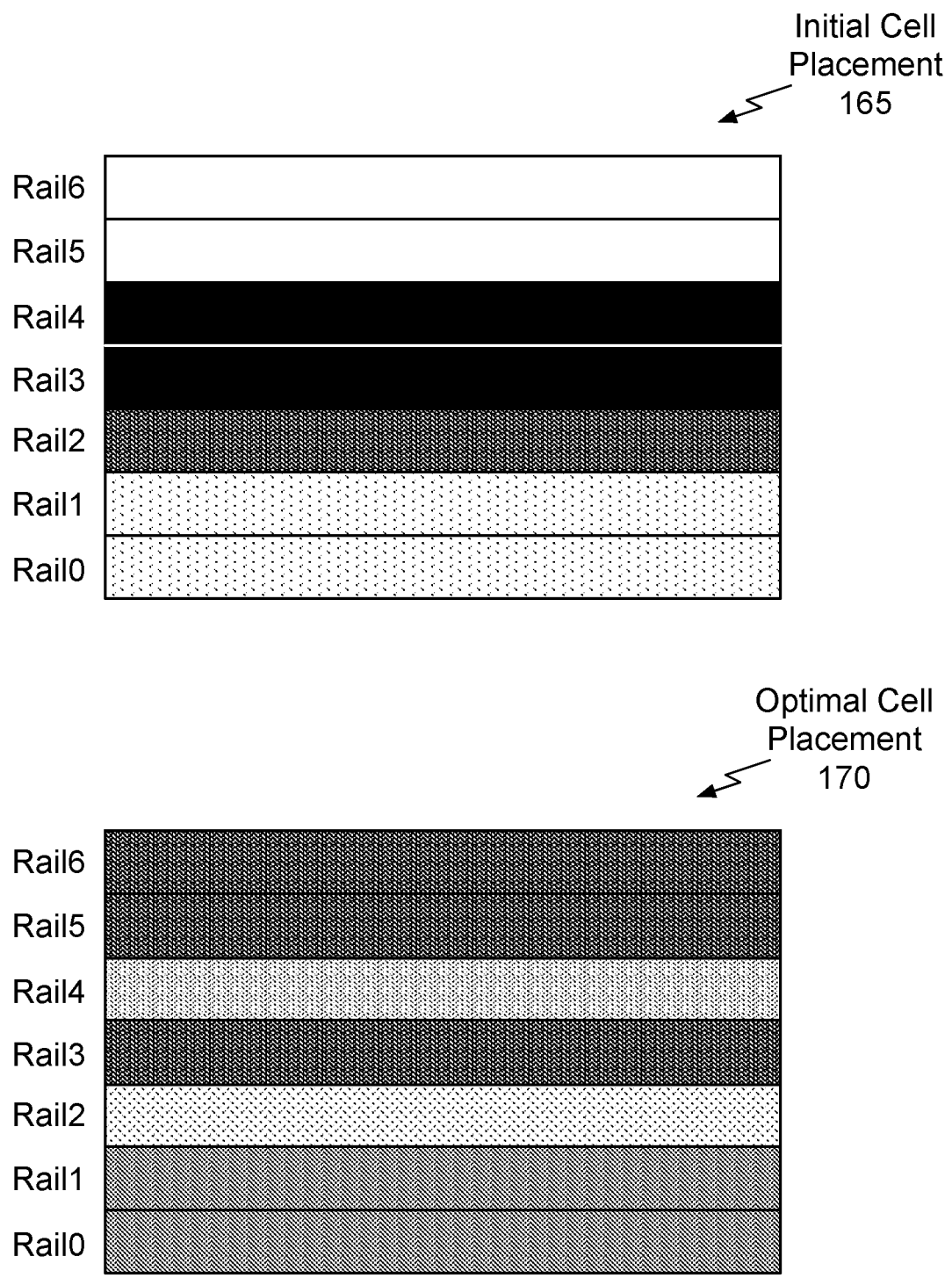
FIG. 1D illustrates supply rail power densities for an initial cell placement and an optimal cell placement, in accordance with an embodiment.

FIG. 1D illustrates supply rail power densities for an initial cell placement 165 and an optimal cell placement 170, in accordance with an embodiment. Each rail is represented by a pattern where darker patterns are associated with higher energy consumption (e.g., power density) compared with lighter patterns. The power density is determined based on the power density of the standard cells that are coupled to the rails. The distribution of power density within the initial cell placement 165 is uneven with rail3 and rail4 having the highest power density and rail5 and rail6 having the lowest power density. The uneven distribution may cause an IR drop for the cells within the initial cell placement 165.

However, if the standard cells can be placed to more evenly distribute the energy consumed per rail, then the IR drop may be reduced. The optimal cell placement 170 has reduced power density for rail2, rail3, and rail4 compared with the initial cell placement 165. The more even distribution increases the power density for rail0, rail1, rail 5, and rail 6. Rearranging the placement of the standard cells based on the power densities mitigates the IR drop problem. For example, rearranging as shown in FIG. 1D reduces the maximum power density for the rails by nearly 50 mV, from 82.7 mV to 29.7 mV for rail 4. Note that the redistribution impacts all of the rails within the region, rather than only impacting the rails having the highest and/or lowest power density. Considering all of the rails while redistributing the power density avoids introducing new IR drop issues.

The redistribution normalizes the power density for the rails within the region. Normalizing causes the current spike for each rail to be reduced and hence the worst case and combined IR drop is also reduced. However, the power density for a rail having the lowest power density will likely increase when the power density is normalized within the region. Reducing the IR drop within each region helps mitigate IR drop violations throughout the integrated circuit layout. Because conventional integrated circuit layouts follow a uniform power grid structure, the power density may be normalized uniformly in each region.

To normalize the power density in a region, the problem is formulated as supply rail power density aware detailed placement problem. Given a region, in an embodiment, the most optimal placement of the standard cells that minimizes the power density for the entire region and the maximum of the per-rail power densities is mathematically bound and is identified using mixed integer linear programming. Limiting rearrangement of the standard cells to remain within the region ensures that timing of the design is minimally affected while mitigating IR drop. Because the timing is only very slightly disturbed, the impact to overall power consumption is also minimal.

Figure 2A:
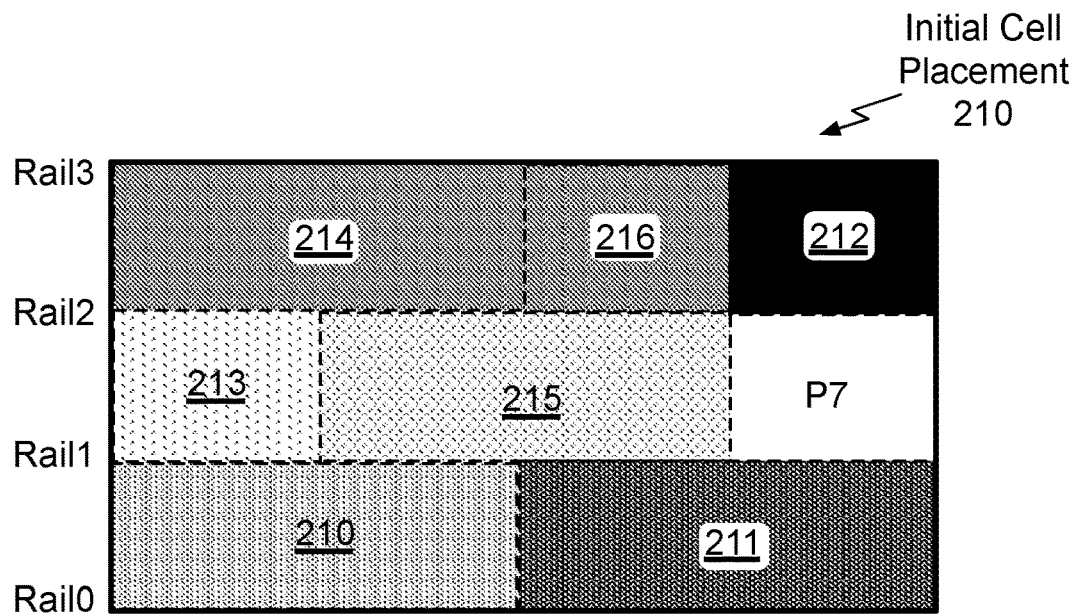
FIG. 2A illustrates an initial cell placement within a region, in accordance with an embodiment.

FIG. 2A illustrates an initial cell placement 210 within a region, in accordance with an embodiment. The region includes cells 210, 211, 212, 213, 214, 215, and 216. Position P7 in the initial cell placement 210 is unoccupied. When rails are shared between two adjacent regions, the cells coupled to a particular shared rail are constrained to remain coupled to the particular shared rail. For example, when rail0 and rail3 are shared between adjacent regions, the cells 214, 216, and 212 are constrained to remain coupled to the rail3 and the cells 210 and 211 are constrained to remain coupled to the rail0. For the purposes of explanation, the following description assumes that rail0 and rail3 are not shared with an adjacent region, so that the cells 210, 211, 212, 214, and 216 may be rearranged to produce the optimal cell placement.

As shown in FIG. 2A, cells 210, 211, 214, and 215 are twice as wide as the other cells in the initial cell placement 210. In other embodiments, one or more of the cells is taller than at least one other cell. In an embodiment, the height and width of the cells is constrained to be an integer multiple of the row height and position dimensions so that the cells are aligned within a grid comprising the placement positions. The cell patterns indicate variations in power density, with power density increasing as the pattern is darker. For example, cell 212 has the greatest power density and cell 213 has the lowest power density.

Figure 2B:
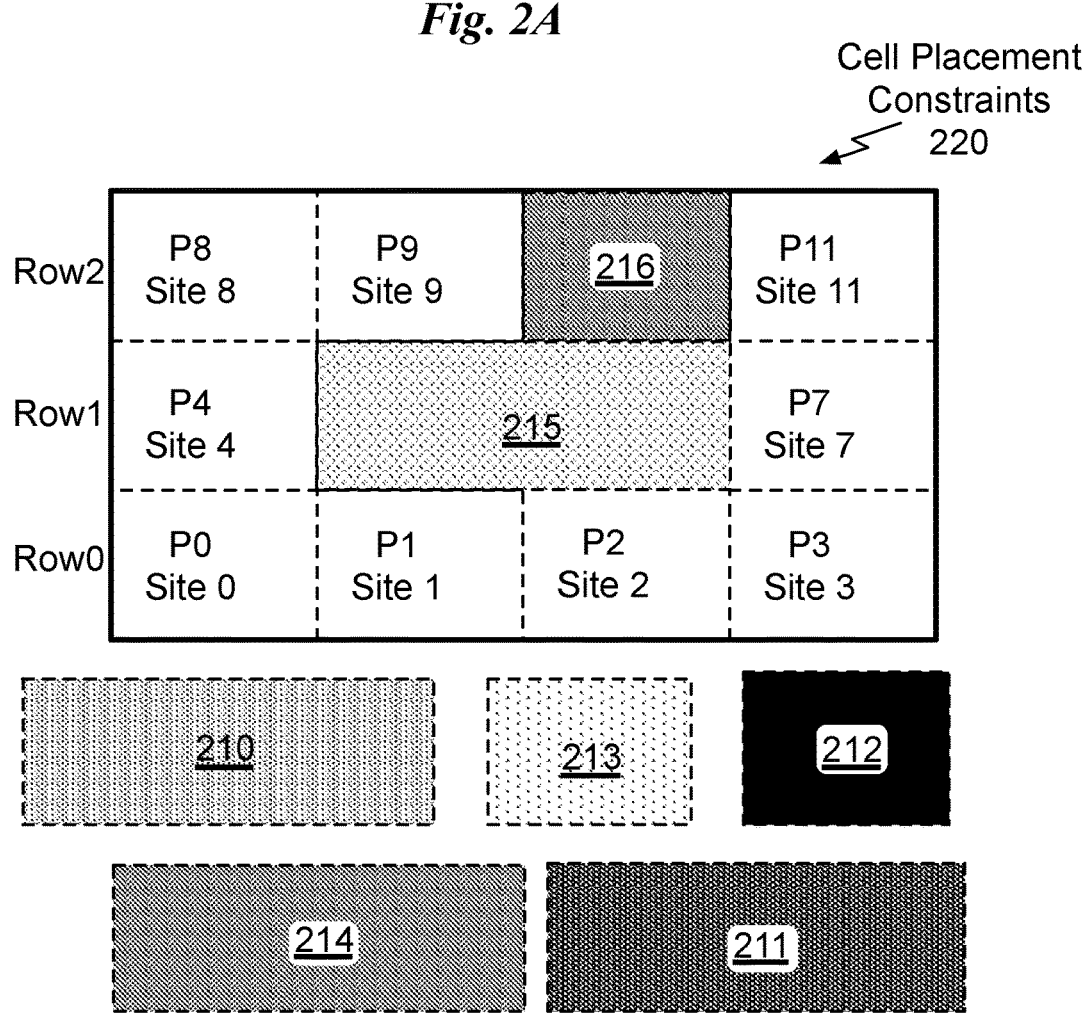
FIG. 2B illustrates cell placement constraints, in accordance with an embodiment.

FIG. 2B illustrates cell placement constraints 220, in accordance with an embodiment. The locations of cells 215 and 216 within the region is fixed so that cells 215 and 216 cannot be moved to different positions within the regions. The ability to fix the location of a cell is important for many integrated circuit designs. The cell 215 is located at positions P5 and P6 and cell 216 is located at position P10, so positions P5, P6, and P10 are not available for placement of other cells. The nine available positions within the region are sites 0-8. Note that site 0, site 1, site 2, site 3, site 4, site 5, site 6, site 7, and site 8 correspond to placement positions P0, P1, P2, P3, P4, P7, P8, P9, and P11, respectively.

Because positions P5, P6, and P10 are occupied with the fixed cells 215 and 216, the cell 210 is limited to four different locations, namely a first location, $\lambda A_0$ at positions P0 and P1, a second location, $\lambda A_1$ at positions P1 and P2, a third location, $\lambda A_2$ at positions P2 and P3, and a fourth location, $\lambda A_3$ at positions P8 and P9. Similarly, the cell 211 is limited to the same four different locations that are defined as $\lambda B_0$, $\lambda B_1$, $\lambda B_2$, and $\lambda B_3$. The cell 214 is also limited to the same four different locations that are defined as $\lambda E_0$, $\lambda E_1$, $\lambda E_2$, and $\lambda E_3$. The smaller cells 212 and 213 are each limited to nine different locations at any of the positions P0, P1, P2, P3, P4, P7, P8, P9, and P11. The nine different locations for the cell 212 are defined as $\lambda C_0$, $\lambda C_1$, $\lambda C_2$, $\lambda C_3$, $\lambda C_4$, $\lambda C_5$, $\lambda C_6$, $\lambda C_7$, and $\lambda C_8$ and the nine different locations for the cell 213 are defined as $\lambda D_0$, $\lambda D_1$, $\lambda D_2$, $\lambda D_3$, $\lambda D_4$, $\lambda D_5$, $\lambda D_6$, $\lambda D_7$, and $\lambda D_8$. The cell placement constraints are mathematically expressed so that each cell is placed or instantiated at only one of the possible locations for the cell, as shown in TABLE 1.

TABLE 1

| Cell placement constraints |
| --- |
| $\lambda A_0 + \lambda A_1 + \lambda A_2 + \lambda A_3 = 1$ |
| $\lambda B_0 + \lambda B_1 + \lambda B_2 + \lambda B_3 = 1$ |
| $\lambda C_0 + \lambda C_1 + \lambda C_2 + \lambda C_3 + \lambda C_4 + \lambda C_5 + \lambda C_6 + \lambda C_7 + \lambda C_8 = 1$ |
| $\lambda D_0 + \lambda D_1 + \lambda D_2 + \lambda D_3 + \lambda D_4 + \lambda D_5 + \lambda D_6 + \lambda D_7 + \lambda D_8 = 1$ |
| $\lambda E_0 + \lambda E_1 + \lambda E_2 + \lambda E_3 = 1$ |

Just as each cell is placed at only one location within the region, each position which is not occupied by a cell having a fixed location may be occupied by either no cell or one cell. There are nine available positions within the region which are sites 0-4, sites 7-9, and site 11, corresponding to positions P0-P4, P7-P9, and P11, respectively. Sites 5, 6, and 10 are occupied by cells 215 and 216 and are unavailable. For example, site 0 (corresponding to position P0) may be occupied by no more than one of $\lambda A_0$, $\lambda B_0$, $\lambda C_0$, $\lambda D_0$, and $\lambda E_0$. The cell site constraints are mathematically expressed so that each position is occupied by no more than one of the cells. The cell site constraints are mathematically expressed so that each site is occupied at most one of the possible cells, as shown in TABLE 2.

TABLE 2

| Cell site constraints |
| --- |
| Site0: |
| $\lambda A_0 + \lambda B_0 + \lambda C_0 + \lambda D_0 + \lambda E_0 \leq 1$ |
| Site1: |
| $\lambda A_0 + \lambda A_1 + \lambda B_0 + \lambda B_1 + \lambda C_1 + \lambda D_1 + \lambda E_0 + \lambda E_1 \leq 1$ |
| Site2: |
| $\lambda A_1 + \lambda A_2 + \lambda B_1 + \lambda B_2 + \lambda C_2 + \lambda D_2 + \lambda E_1 + \lambda E_2 \leq 1$ |
| Site3: |
| $\lambda A_2 + \lambda B_2 + \lambda C_3 + \lambda D_3 + \lambda E_2 \leq 1$ |
| Site4: |
| $\lambda C_4 + \lambda D_4 \leq 1$ |
| Site7: |
| $\lambda C_5 + \lambda D_5 \leq 1$ |
| Site8: |
| $\lambda A_3 + \lambda B_3 + \lambda C_6 + \lambda D_6 + \lambda E_3 \leq 1$ |
| Site9: |
| $\lambda A_3 + \lambda B_3 + \lambda C_7 + \lambda D_7 + \lambda E_3 \leq 1$ |
| Site11: |
| $\lambda C_8 + \lambda D_8 \leq 1$ |

Given the cell placement constraints and the cell site constraints, a rearranged placement is identified that mitigates the IR drop. Cells may be rearranged within the region to better normalize the switching current across the supply rails so that the worst current spike for any of the rails is lowered. First the power density is computed for each rail. However, because different cells may not be active at the same times, rather than simply computing the power density in the spatial dimension (within a row), the time dimension may also be used to compute the power density.

A timing window may be defined that includes multiple time slices. In an embodiment, the timing window corresponds to a frequency of a clock. In an embodiment, the timing window may be variable in duration. In an embodiment, a number of slices in each timing window is a fixed integer value. Cell activity is estimated for each time slice within the timing window to determine per-time slice power density values for each cell. Cells with disjoint per-slice power density activity may be placed within the same row to minimize the probability of IR drop for the rails coupled to the row.

Figure 2C:
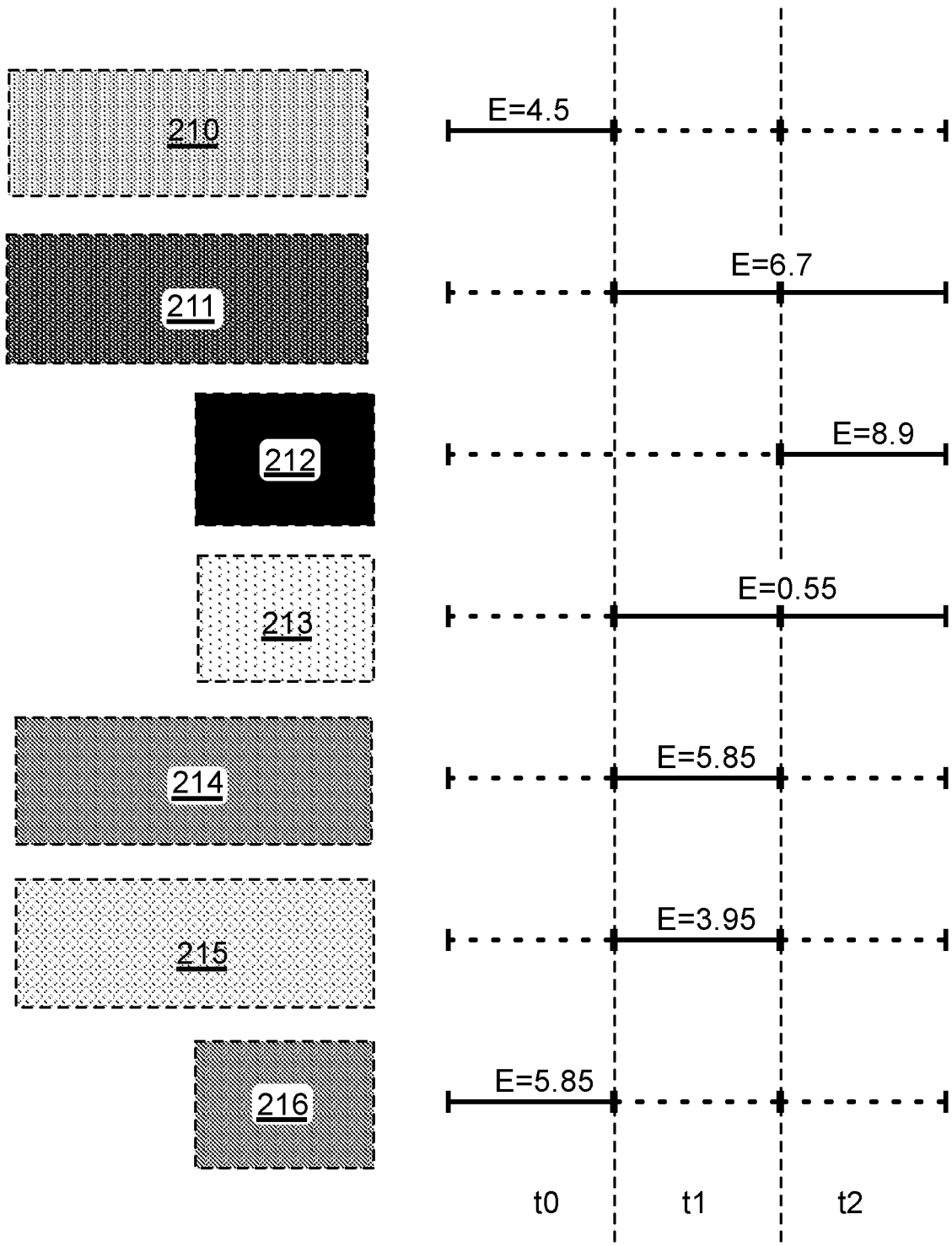
FIG. 2C illustrates temporal power density characteristics of cells, in accordance with an embodiment.

FIG. 2C illustrates temporal power density characteristics of cells, in accordance with an embodiment. A timing window includes slices t0, t1, and t2. The cell 210 is active only during slice t0, having a power density of E=4.5. The cell 216 is also active only during slice t0 and has a power density of E=5.85. Therefore, cells 210 and 216 should not be coupled to the same power supply rail to reduce the probability of IR drop. In contrast with cells 210 and 216, the cells 211 and 213 are active only during slices t1 and t2 and therefore one of cells 211 or 213 may be coupled to the same supply rail as either cell 210 or 216. When cells having overlapping active time slices must be placed in the same rows, it may be possible to mix cells having different power density values on the same row to normalize the maximum total power density across the overlapping active time slice. For example, cells 211 and 214 may be coupled to a set of supply rails instead of coupling cells 211 and 212 to the same set of supply rails.

In an embodiment, the active time slices and estimated power density for each active time slice are computed by applying several vector patterns during simulation to capture the worst-case dynamic switching currents for the cells. In an embodiment, the vector patterns include dominant vectors and vectorless (random) patterns. Vectors usually span a few hundred thousand cycles, so therefore only a small number of worst-case time slices are simulated. A challenge is to ensure that a placement fix for one pattern does not create an additional violation for another pattern. An IR drop is a localized problem and fixing only the violating cells without considering a region may result in additional power density hotspots due to movement of cells that are just below a violating threshold. Performing supply rail power density aware placement using mixed integer linear programming provides a robust method to fix violations that not only is vector/vectorless pattern independent, but also avoids introducing new violations.

As previously explained, a simple way to avoid cells switching during the same time slice is to ensure that the active time slices for the cells never overlap. Because, power density has both spatial and temporal properties, placing the cells that have disjoint active time slices in the same rows will ensure that the peak dynamic current is minimized. However, if some or all the cells in a region have overlapping active time slices, then damage control may be performed preemptively. The damage control refers to the reduction in worst-case peak current when the active time slices overlap by placing a high drive strength (e.g., power density) cell next to a cell having lower drive strength rather than placing two high drive strength cells in the same row. Active time slice overlap does not ensure that the cells will switch together, but if the cells are preemptively rearranged to be coupled to different power supply rails, the probability of the cells in the same row switching during the same time slice is reduced.

Given the cell placement constraints, the cell site constraints, and the per-slice power density for each cell, the rail power constraints may be expressed mathematically. Referring to FIGS. 2B and 2C, the cells that may occupy placement positions P0-P3 and be coupled to rail 0 include cells 210, 211, 212, 213, and 214. The rail power constraints for the rail 0 for each time slice in the timing window are:

$$t0: .5(\lambda A_0 + \lambda A_1 + \lambda A_2) - P0 \leq 0$$

$$t1: 6.7(\lambda B_0 + \lambda B_1 + \lambda B_2) + 0.55(\lambda D_0 + \lambda D_1 + \lambda D_2 + \lambda D_3) + 5.85(\lambda E_0 + \lambda E_1 + \lambda E_2) - P0 \leq 0$$

$$t2: .7(\lambda B_0 + \lambda B_1 + \lambda B_2) + 8.9(\lambda C_0 + \lambda C_1 + \lambda C_2) + 0.55(\lambda D_0 + \lambda D_1 + \lambda D_2) - P0 \leq 0$$

The cells that may occupy placement positions P0-3 and P4-P7 and be coupled to rail 1 include cells 210, 211, 212, 213, 214, and 215. The location of cell 215 is fixed at placement positions P5 and P6 and coupled to the rail 1. The cell 215 is active during time slice t1 with a power density of 3.95. Therefore, the equation for time slice t1 includes the power density 3.95 on the right side instead of zero. The rail power constraints for the rail 1 for each time slice in the timing window are:

$$t0: 4.5(\lambda A_0 + \lambda A_1 + \lambda A_2) - P1 \leq 0$$

$$t1: 6.7(\lambda B_0 + \lambda B_1 + \lambda B_2) + 0.55(\lambda D_0 + \lambda D_1 + \lambda D_2 + \lambda D_3 + \lambda D_4 + \lambda D_5) + 5.85(\lambda E_0 + \lambda E_1 + \lambda E_2) - P1 \leq 3.95$$

$$t2: 6.7(\lambda B_0 + \lambda B_1 + \lambda B_2) + 8.9(\lambda C_0 + \lambda C_1 + \lambda C_2 + \lambda C_3 + \lambda C_4 + \lambda C_5) + 0.55(\lambda D_0 + \lambda D_1 + \lambda D_2 + \lambda D_3 + \lambda D_4 + \lambda D_5) - P1 \leq 0$$

The cells that may occupy placement positions P4-P7 and P8-P1 land be coupled to rail 2 include cells 210, 211, 212, 213, 214, 215, and 216. The location of cell 215 is fixed at placement positions P5 and P6 and coupled to the rail 2. The cell 215 is active during time slice t1 with a power density of 3.95. Therefore, the equation for time slice t1 includes the power density 3.95 on the right side instead of zero. The rail power constraints for the rail 2 for each time slice in the timing window are:

$$t0: 4.5(\lambda A_3) - P2 \leq -5.85$$

$$t1: 6.7(\lambda B_3) + 0.55(\lambda D_6 + \lambda D_7 + \lambda D_8) + 5.85(\lambda E_3) - P2 \leq -3.95$$

$$t2: 6.7(B_3) + 8.9(\lambda C_6 + \lambda C_7 + \lambda C_8) + 0.55(\lambda D_6 + \lambda D_7 + \lambda D_8) - P2 \leq 0$$

The cells that may occupy placement positions P8-P1 land be coupled to rail 3 include cells 210, 211, 212, 213, 214, and 216. The rail power constraints for the rail 3 for each time slice in the timing window are:

$$t0: 4.5(\lambda A_3) - P3 \leq -5.85$$

$$t1: 6.7(\lambda B_3) + 0.55(\lambda D_6 + \lambda D_7 + \lambda D_8) + 5.85(\lambda E_3) - P3 \leq 0$$

$$t2: 6.7(B_3) + 8.9(\lambda C_6 + \lambda C_7 + \lambda C_8) + 0.55(\lambda D_6 + \lambda D_7 + \lambda D_8) - P3 \leq 0$$

Figure 2D:
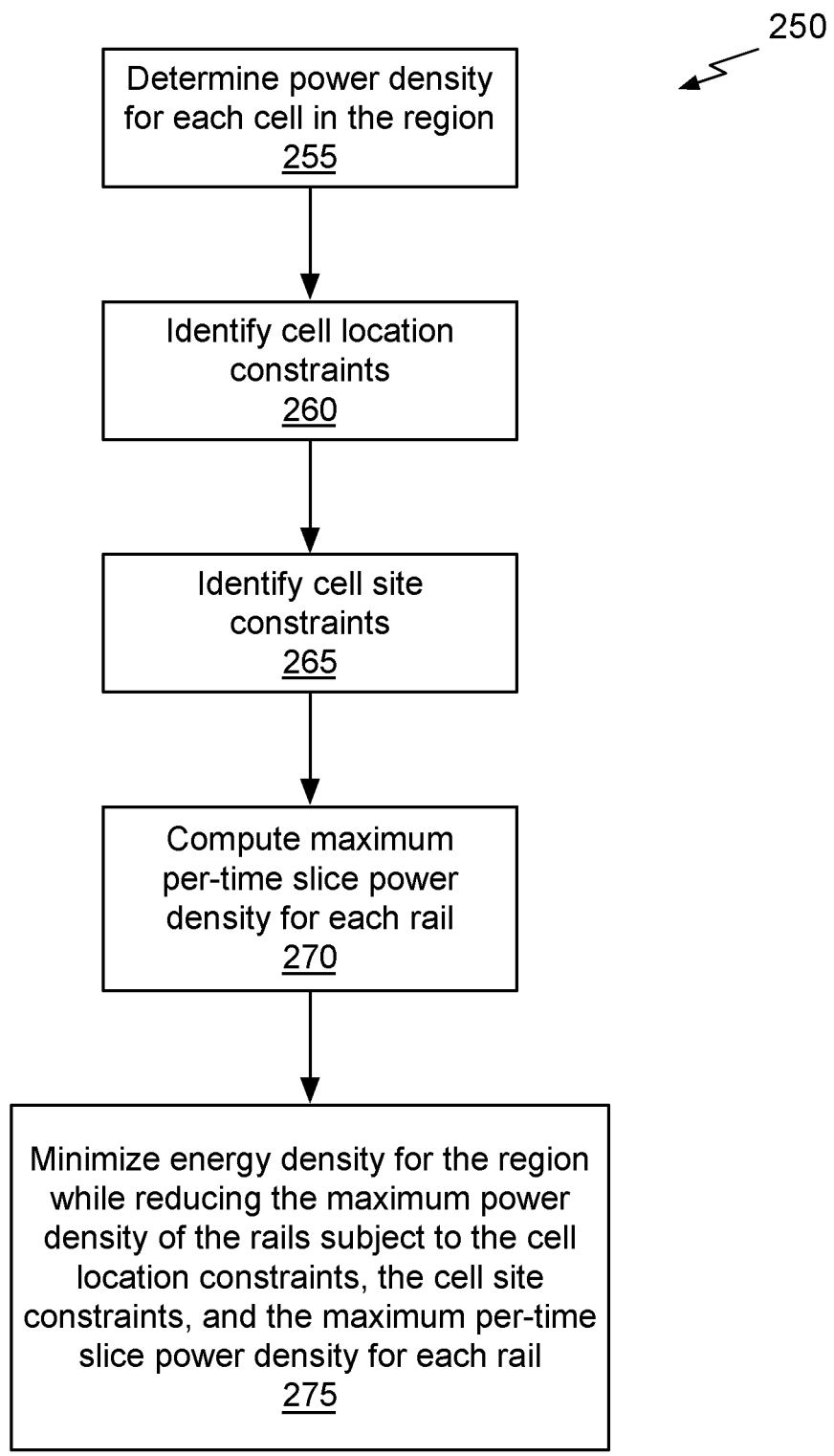
FIG. 2D illustrates a flowchart of a method for rail power density aware parallel detailed placement using mixed integer programming, in accordance with an embodiment.

A supply rail power density aware parallel detailed placement using mixed integer programming algorithm follows an approach that tries to normalize power density for every cell in a region. In general, a hotspot region is emphasized rather than individual standard cell instances. For an embodiment, within each region, all of the cells are treated equally and all of the cells participate in mitigating the IR drop. The IR drop within the region can be reduced by sharing or normalizing the peak current consumption (e.g., maximum power density) per rail. The supply rail power density aware parallel detailed placement using mixed integer programming algorithm is provided in TABLE 3 and a method for performing the supply rail power density aware parallel detailed placement using mixed integer programming algorithm is shown in FIG. 2D.

TABLE 3

The mixed integer programming algorithm

Input: input.def.gz, lefs.gz, spef.gz, twf.gz, LIBs, boundary boxes(B)
Output: incremental.shuffled.def.gz

TABLE 3-continued

The mixed integer programming algorithm

1. Compute Energy values (E) of all the cells from .LIBs (2d interpolation) using :-
   (i) $Slew_{input}$ from twf.gz (timing window file)
   (ii) $Cap_{output}$ from spef.gz
   $$E = f(Slew_{input}, Cap_{output}) \quad (1)$$
2. do in parallel foreach b EB
   Minimize sum of rail energy & max energy among rails subject to legalization & rail energy constraints.
   $$\min_{\lambda_c, P_x} \sum_{x \in S} P_x + \alpha P_m, \; m \in \max(P_x), \; S \in Rails \quad (2)$$
3. $\lambda_c$ binary variable for the standard cell's positions
4. $P_x$ is the energy consumed by each rail
5. $P_m$ is the max energy consumed among all rails
6. $\alpha$, tunable parameter for minimization between max energy among rails & sum of energy among rails
   $$s.t. \sum_{k \in K_c} \lambda_c^k = 1, \; \forall \, c \in C \quad (3)$$
7. C, collection of cells inside a boundary box
8. $K_c$, set of legal positions of a standard cell
9. A cell can occupy only one position out of available positions
   $$s.t. \sum_{k \in K} \sum_{c \in C} p_{rq} \lambda_c^k \leq 1, \; \forall \, r \in R, \, q \in Q \quad (4)$$
10. R, Q are the set of site rows and site columns respectively.
11. A cell site in each row & column can be occupied by only one cell's position.
    $$s.t. \sum_{k \in K_L} \sum_{t \in T} \sum_{c \in C} (E_c)_t p_{c_L} \lambda_c^k \leq P_x, \; \forall \, c \in C, \quad (5)$$
    $x \in Rails$
    $L \in Rows$(corresponding to Rails of x)
    $T \in TimeSlices$(Sampling resolution of Fastest Clock)
12. For every time slice & for each rail which involves one/two rows find the worst energy consumed by each slice.
    $$0 \leq \lambda \geq 1 \quad (6)$$
13. Convert the $\lambda_c$ (cell positions) into an incremental def and load back to the P&R tool.

FIG. 2D illustrates a flowchart of a method 250 for supply rail power density aware parallel detailed placement using mixed integer programming, in accordance with an embodiment. Each block of method 250, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. The method 250 may be executed by any one system, or any combination of systems, including, but not limited to, those described herein. Furthermore, persons of ordinary skill in the art will understand that any system that performs method 250 is within the scope and spirit of embodiments of the present disclosure.

The method 250 is performed for each region in an integrated circuit layout. In an embodiment, the method 250 is performed in parallel for at least two regions. At step 255, power density for each cell in the region is determined. In an embodiment, the power density or energy consumed by a standard cell is obtained from simulation data stored in a database (.LIB). The power density may be a function of input slew and load capacitance, as shown in equation (1) of TABLE 3. In an embodiment, the IR aware placement should be robust even for the worst-case scenario where all the cells are expected to switch together (100% activity). The worst-case can be emulated by assigning the power density value of each cell to each of the time slices in the timing window. Thus, the active time slices for all of the cells will overlap, mirroring the worst summation of energy at any instant of time.

The objective of mixed integer linear programming (MILP) is to find the cell placement that avoids active time slice overlap between cells, and if that is not possible, then seek the placement that reduces the IR drop impact on the rails. In an embodiment, instead of using the peak current of a cell from a Composite Current Source (CCS) model, the energy value from .LIB may be used to normalize for the entire current waveform instead of selecting the worst current value as the power density. To normalize the energy and/or current consumption per rail, the cells are rearranged based on the active time slices—effectively performing the supply rail power density aware detailed placement.

At step 260, cell location constraints are identified. The cell location constraints are represented in equation (3) shown in TABLE 3. At step 265, cell site constraints are identified. The cell site constraints are represented in equation (4) shown in TABLE 3. In an embodiment, steps 260 and 265 provide legalization constraints for the MILP. Due to the generic nature of equations (3) and (4), legalization can be accomplished for cells that occupy any integer number of placement positions. In contrast, some conventional legalization techniques do not allow cells that span more than one row.

At step 270, a maximum per-time slice power density is computed for each rail. Equation (5) shown in TABLE3 models the per-time slice power density (energy constraint) for each rail. Equation (5) computes a power density estimate if the cells have a timing slice overlap and/or are disjoint for a given rail. Note that the maximum per-time slice power density for each rail is computed for each placement for the region. For example, the maximum per-time slice power density for the initial cell placement 210 of FIG. 2B may be computed using the per-time slice power density estimates for each cell shown in FIG. 2C. The maximum power density for rail 0 and the initial cell placement 210 during time slices t0, t1, and t2 is 4.5, 6.7, and 6.7, respectively. Thus, the maximum power density for rail 0 during the time window is $E_{R0}=6.7$. The maximum power density for rail 1 and the initial cell placement 210 during time slices t0, t1, and t2 is 4.5, 10.2, and 7.25, respectively. Thus, the maximum power density for rail 1 during the time window is $E_{R1}=10.2$. When the cells are rearranged to produce another cell placement, the maximum power densities for each supply rail typically change.

At step 275, energy density of the region is minimized while the maximum power density of the rails is reduced subject to the cell location constraints, the cell site constraints, and the maximum per-time slice power density for each rail. In an embodiment, a cost function includes two terms, where a first term is an overall rail power density for the region and a second term is a maximum of the per-time slice rail power densities. For each placement, the first term is computed as a summation of the maximum power density for each rail (for the same or different time slices). In other words, a single maximum power density contributes to the summation for each rail, so the summation for a region with four rails equals $E_{R0}+E_{R1}+E_{R2}+E_{R3}$. The second term is a maximum of the maximum power densities for the rails (for the same or different time slices). Thus, the second term equals a maximum of $E_{R0}$, ERI, $E_{R2}$, and $E_{R3}$. The second term may be scaled by a tuning parameter.

In an embodiment, equation (2) shown in TABLE 3 is used to minimize the overall power density for the region and simultaneously reduce the maximum power density consumed by any one of the rails. Simultaneously reducing the maximum power density consumed by any one of the rails ensures that an individual rail does not get overloaded while the overall power density for the region is minimized. The minimization takes place subject to the legalization constraints and results in an optimal IR aware cell placement for the region which will reduce the power density and IR drop for the rails.

In an embodiment, the methods 120 and 250 may be performed for at least two different region partitionings of an integrated circuit layout. In an embodiment, the regions for each partitioning should abut without overlapping to cover the integrated circuit layout. Compared with a first partitioning, the regions in a second partitioning may be shifted horizontally and/or vertically by an integer number of placement positions. Compared with a first partitioning, a size of the regions in a second partitioning may increased or decreased by an integer number of placement positions.

Figure 3A:
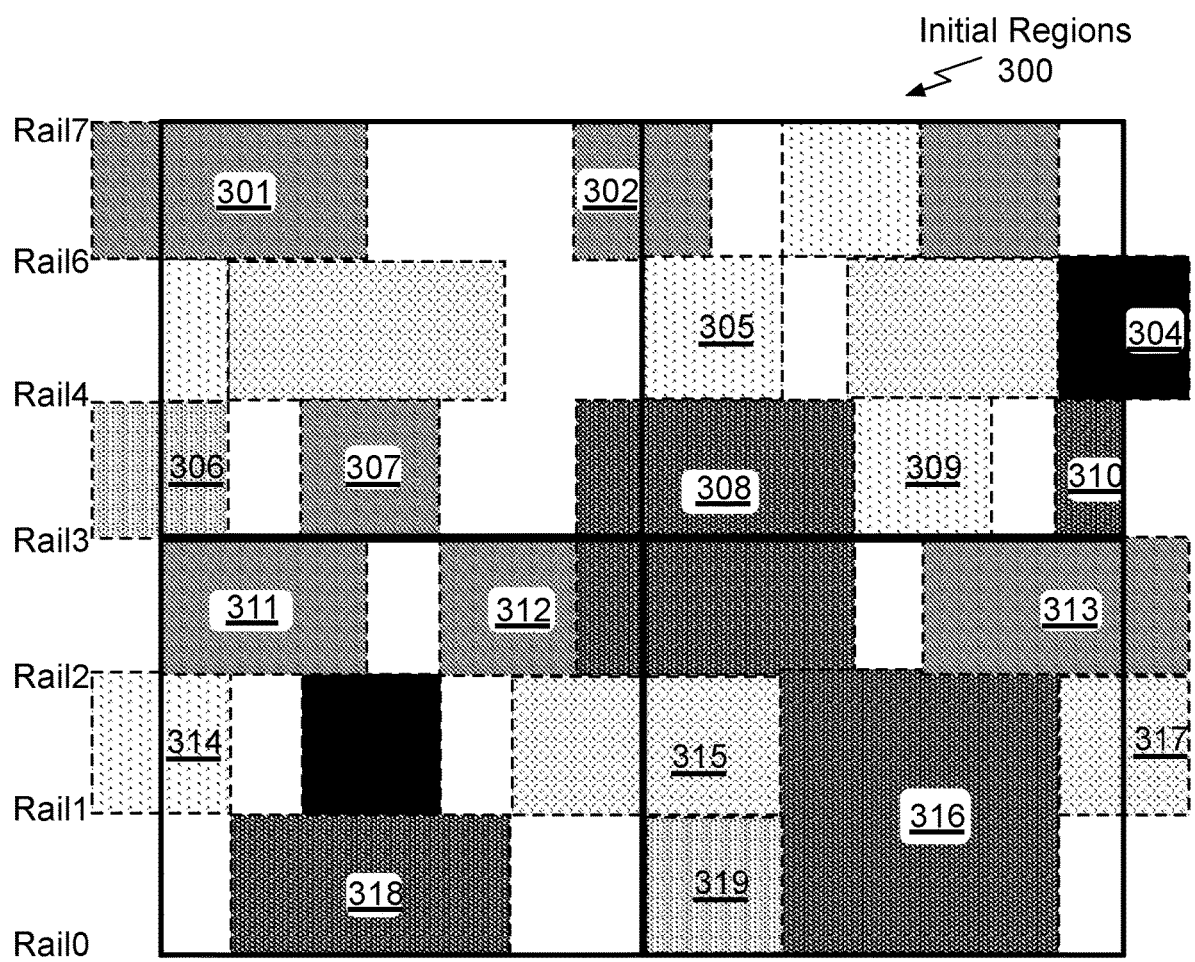
FIG. 3A illustrates an integrated circuit layout partitioned into initial regions, in accordance with an embodiment.

FIG. 3A illustrates an integrated circuit layout partitioned into initial regions 300, in accordance with an embodiment. For the initial regions 300, a minimum cell size is a cell 310 and each cell is aligned to a position that is the minimum cell size. Cells that straddle a region boundary, such as cells 301, 306, 314, 308, 304, 313, and 317 have fixed locations. Cells that are coupled to a rail that is included in at least two different regions, such as rail 3 also have fixed locations. If the cells in different regions that are coupled to the same rail are not fixed, the placement for each region cannot be optimized in parallel because the maximum per rail power density cannot be determined for a particular placement for a first region without knowing the cells that are coupled to the rail in a second region.

Figure 3B:
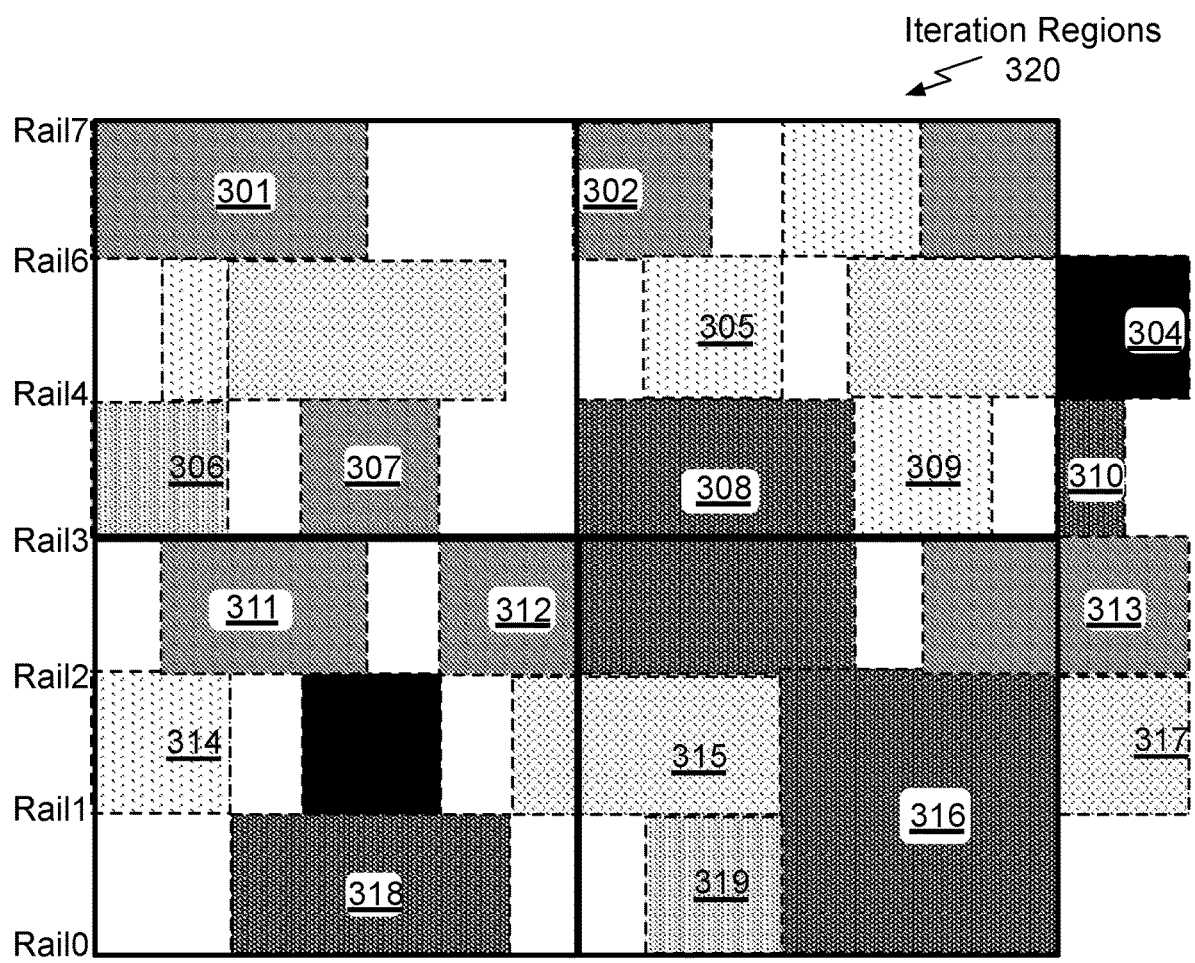
FIG. 3B illustrates the integrated circuit layout partitioned into different regions, in accordance with an embodiment.

FIG. 3B illustrates the integrated circuit layout partitioned into different regions, in accordance with an embodiment. During a subsequent iteration of cell placement optimization, the integrated circuit layout may be partitioned into iteration regions 320 that are different compared with the initial regions 300. For the iteration regions 320, the cells 301, 306, 314, 304, 313, and 317 no longer straddle region boundaries and therefore are not necessarily at fixed locations. The optimal cell placement for one or more regions of the iteration regions 320 may reduce IR drop compared with the optimal cell placement that is computed for the one or more regions of the initial regions 300.

Figure 3C:
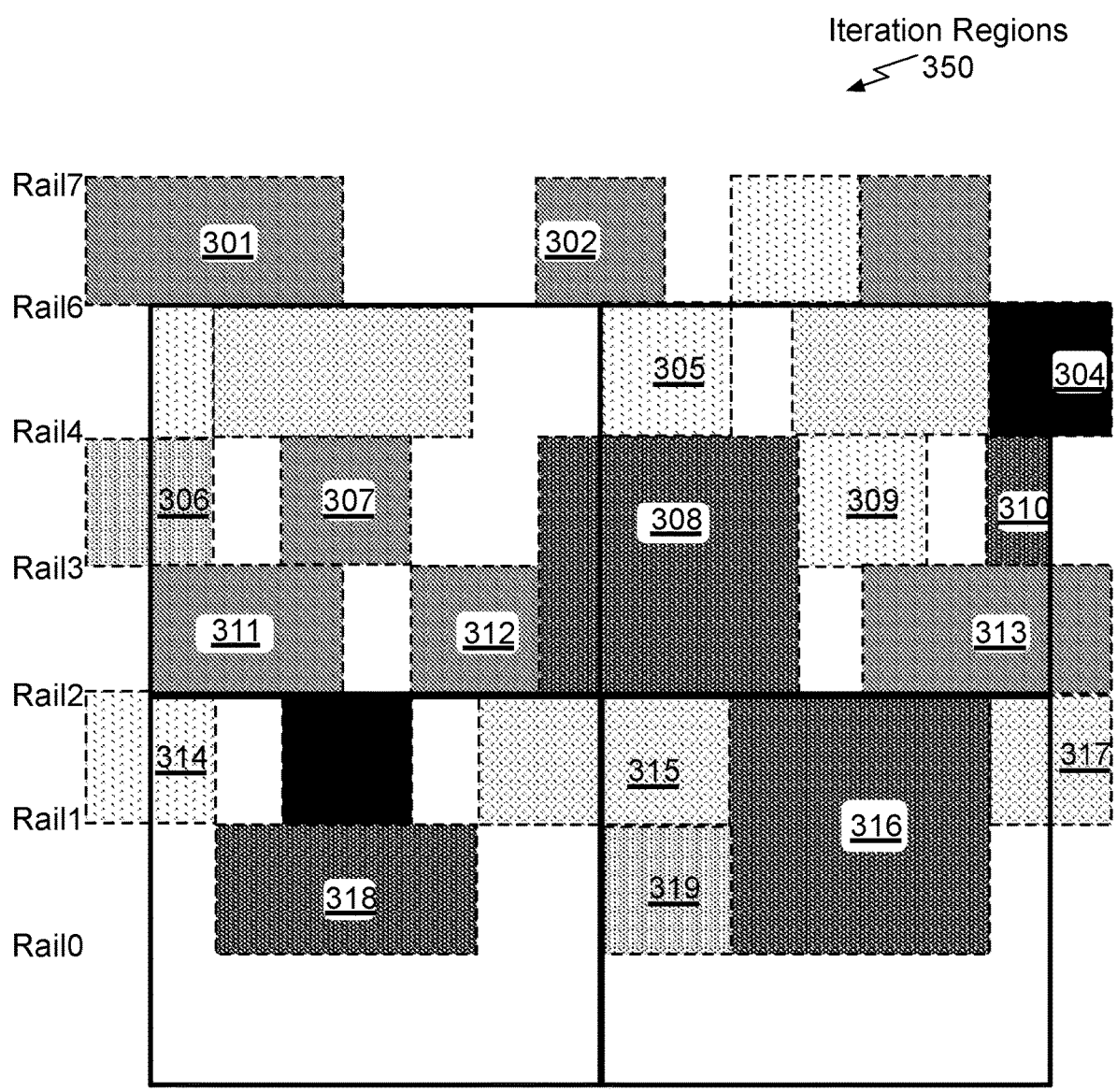
FIG. 3C illustrates the integrated circuit layout partitioned into different regions, in accordance with an embodiment.

FIG. 3C illustrates the integrated circuit layout partitioned into different regions, in accordance with an embodiment. During another subsequent iteration of cell placement optimization, the integrated circuit layout may be partitioned into iteration regions 350 that are different compared with the initial regions 300 and the iteration regions 320. For the iteration regions 350, cells 306, 308, 314, 304, 313, and 317 straddle region boundaries and therefore are at fixed locations. The optimal cell placement for one or more regions of the iteration regions 350 may reduce IR drop compared with the optimal cell placement that is computed for the one or more regions of the initial regions 300 and/or 320.

The supply rail power density aware placement of the cells is done based on the power density of the cells which is driven by E=f(Slew, Cap). The cells are placed in rows such that the power density of each supply rail is minimized, resulting in the overall reduction of the power density in each region. The MILP algorithm may be executed in parallel within a multi-thread environment with each thread optimizing a different region. Each thread rearranges the cell placement to reduce the energy consumed by the rails, which in-turn reduces the current spike per rail and hence helps in reducing IR drop. After the cells have been optimally placed subject to legalization and maximum rail power density constraints, an incremental cell location update may be generated for the integrated circuit layout which can be read (loaded) by a Place & Route tool.

Parallel Processing Architecture

Figure 4:
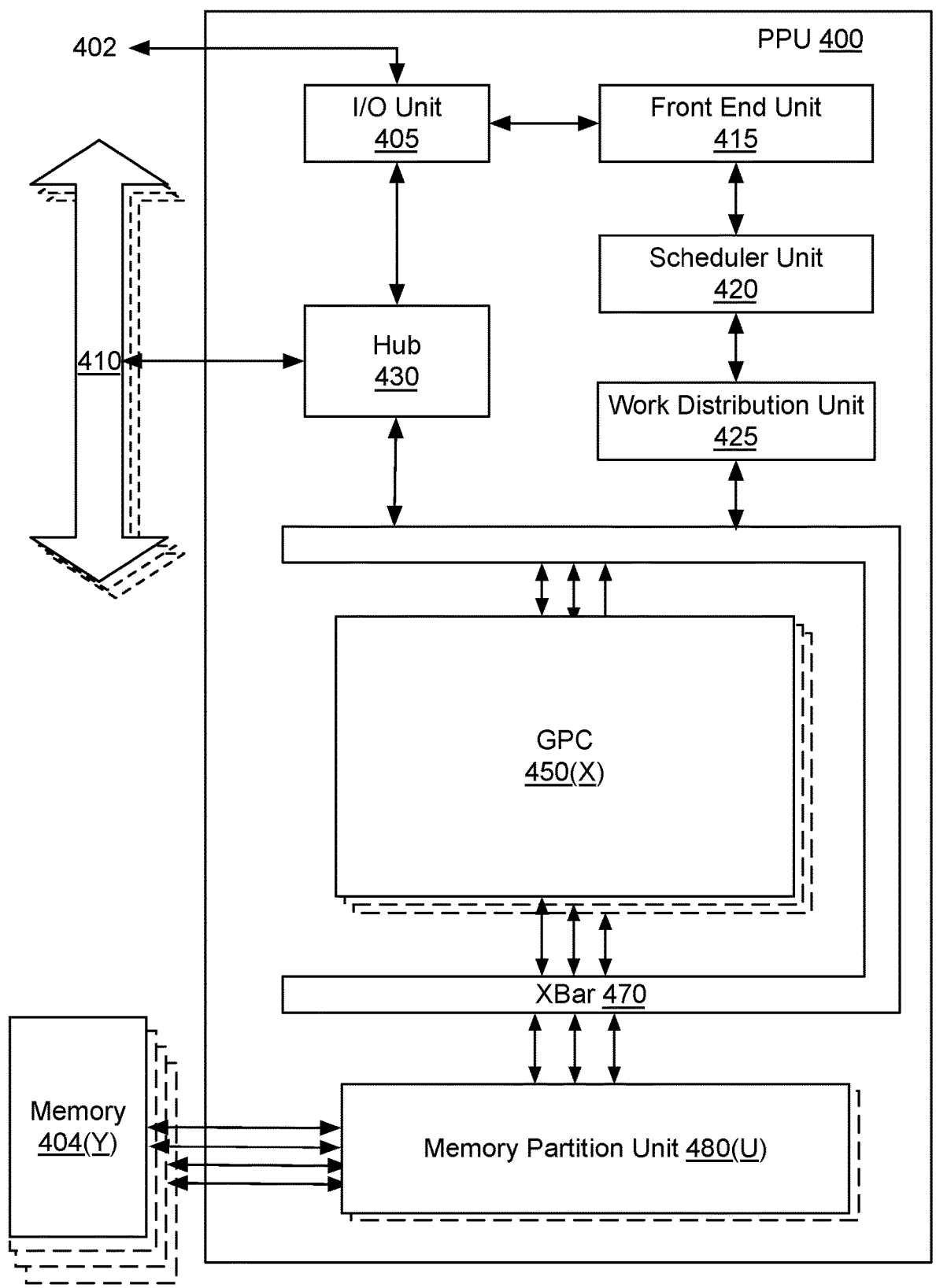
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to perform the method 120 and/or 250. The method 120 and/or 250 may be used to optimize an integrated circuit layout for the PPU 400. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
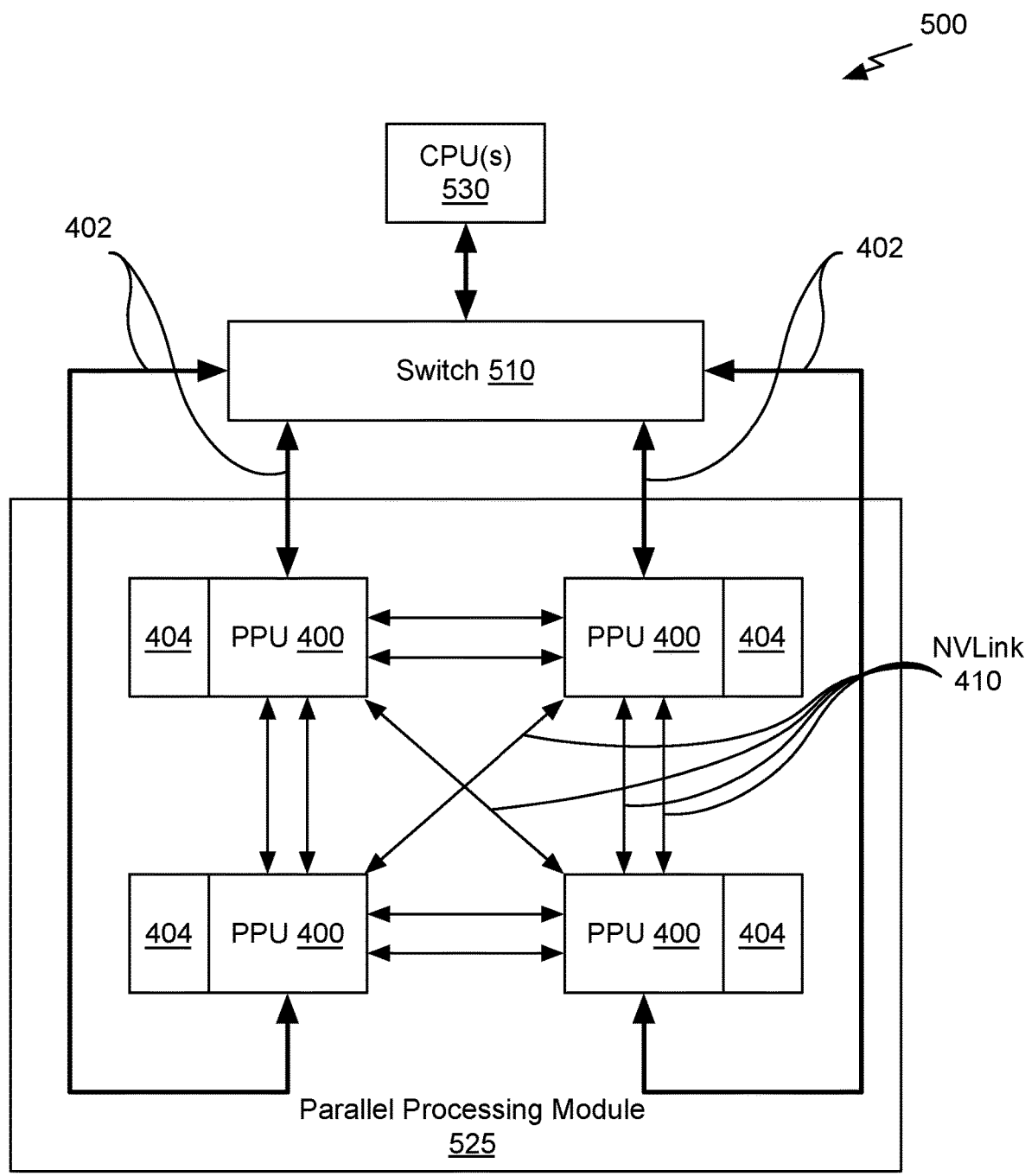
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 120 and/or 250 shown in FIGS. 1B and 2D, respectively. The processing system 500 includes a CPU 530, switch 510, and multiple PPUs 400, and respective memories 404.

Each PPU 400 may include hundreds or thousands of cores that are capable of handling hundreds or thousands of software threads simultaneously. The PPUs 400 may generate pixel data for output images in response to rendering commands (e.g., rendering commands from the CPU(s) 530 received via a host interface). The PPUs 400 may include graphics memory, such as display memory, for storing pixel data or any other suitable data, such as GPGPU data. The display memory may be included as part of the memory 404. The PPUs 400 may include two or more GPUs operating in parallel (e.g., via a link). The link may directly connect the GPUs (e.g., using NVLINK 410) or may connect the GPUs through a switch (e.g., using switch 510). When combined together, each PPU 400 may generate pixel data or GPGPU data for different portions of an output or for different outputs (e.g., a first PPU for a first image and a second PPU for a second image). Each PPU 400 may include its own memory 404, or may share memory with other PPUs 400.

The PPUs 400 may each include, and/or be configured to perform functions of, one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

Figure 5B:
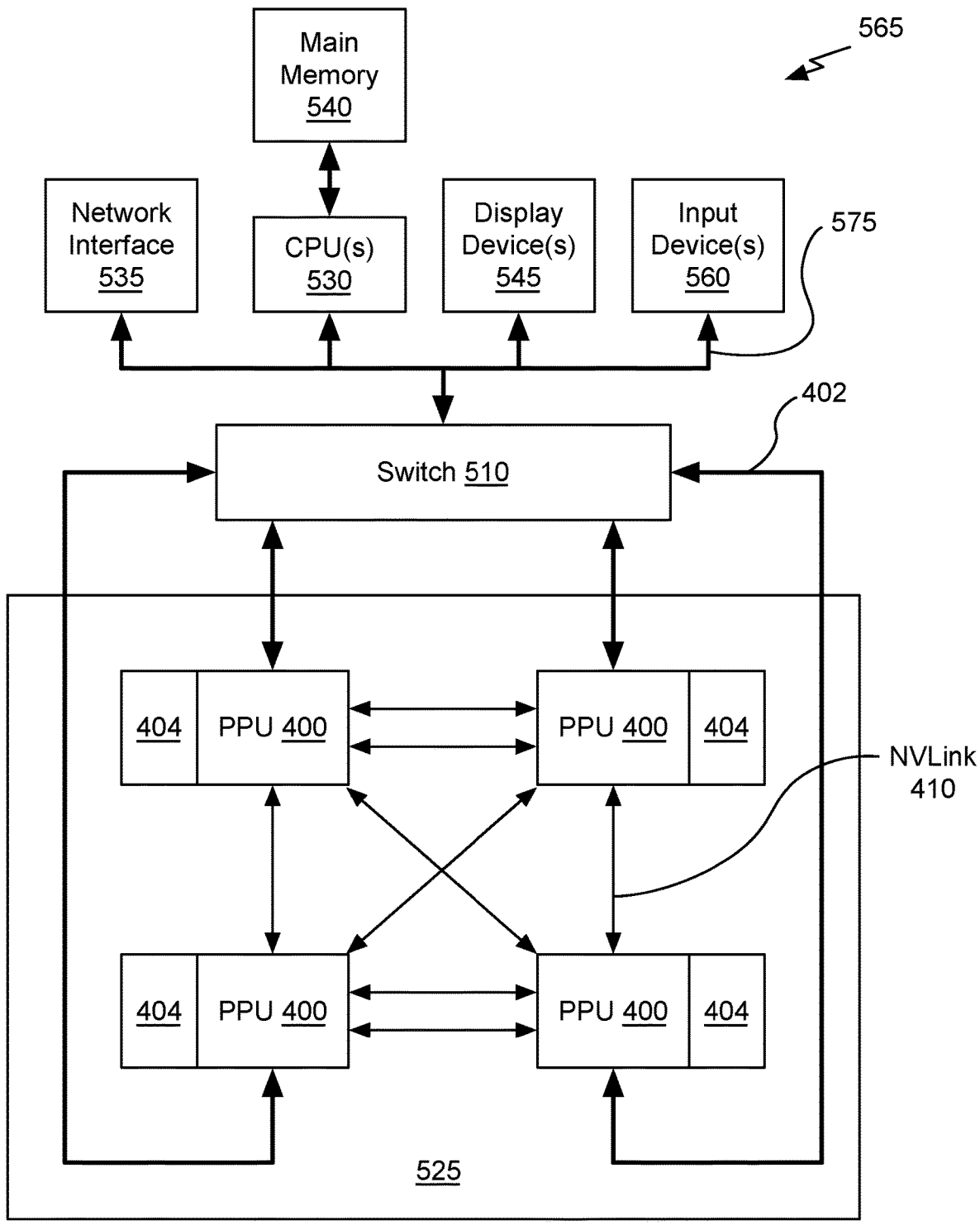
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 120 and/or 250 shown in FIGS. 1B and 2D, respectively.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Figure 5C:
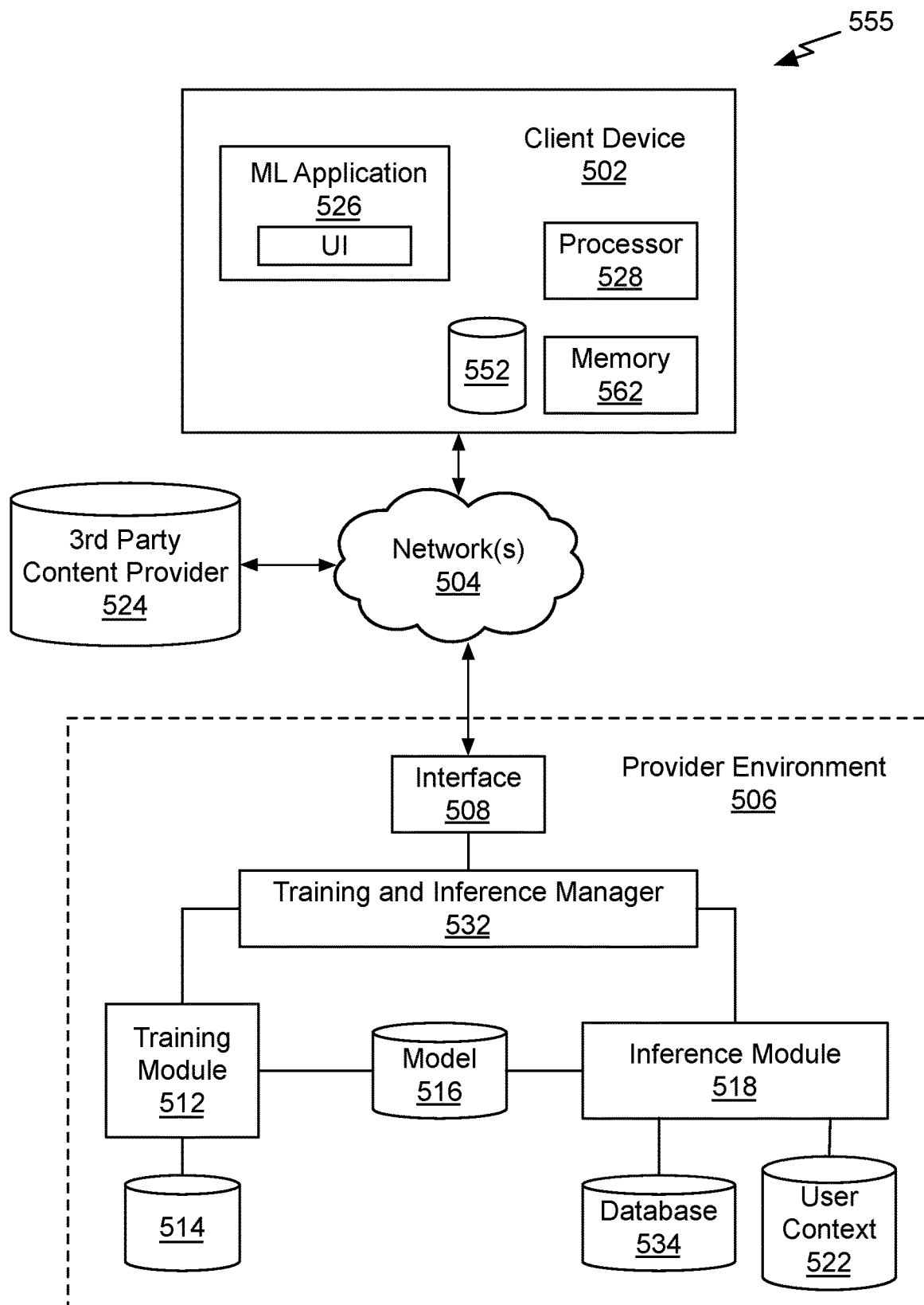
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Example Streaming System

Figure 6:
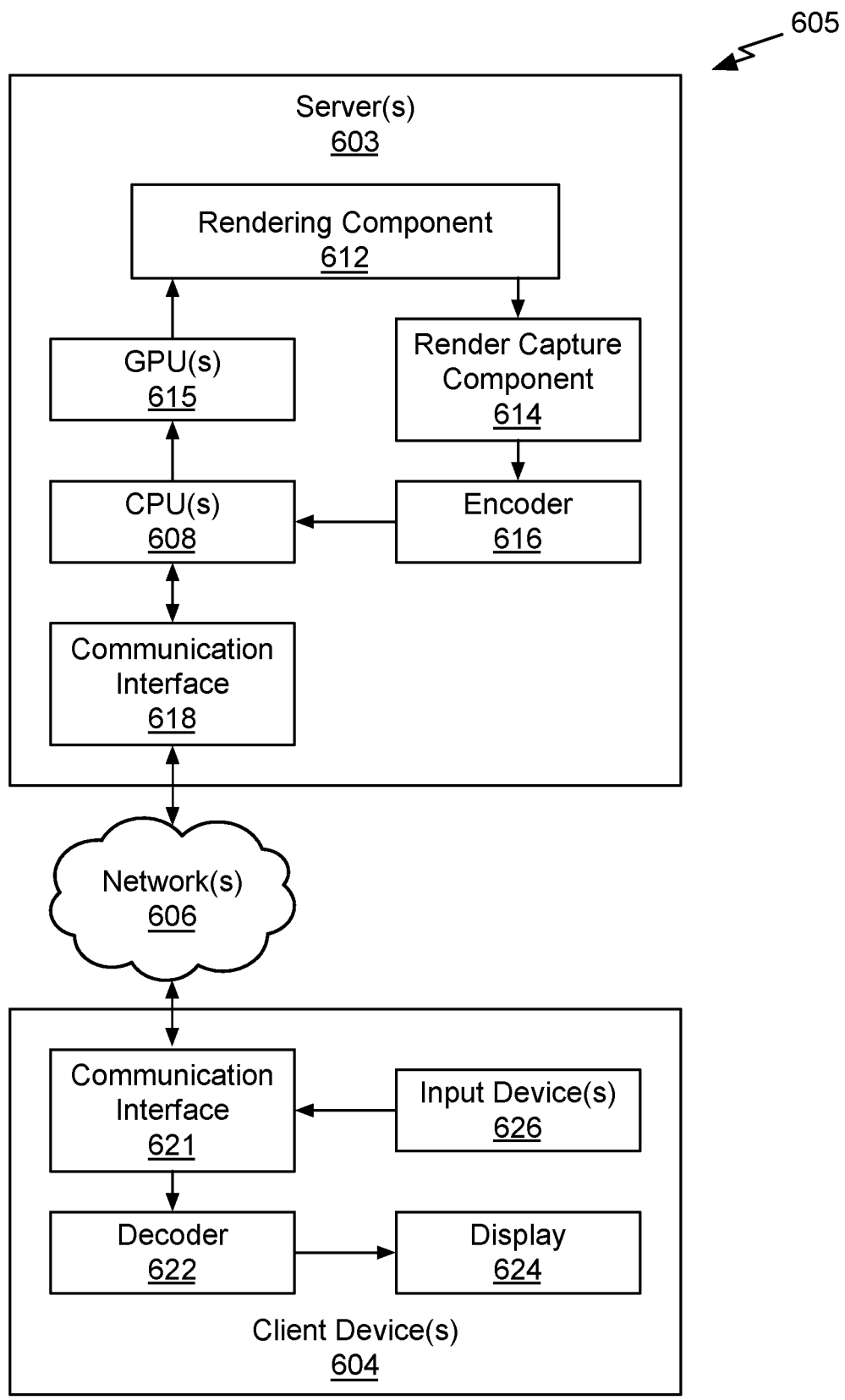
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the sever(s) 604 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
    obtaining power density values for a plurality of cells in an initial cell placement for an integrated circuit layout, wherein the initial cell placement is subdivided into multiple regions, and wherein at least a first region of the multiple regions includes multiple power supply rails and a first portion of the cells of the plurality of cells in the initial cell placement;
    for each of a plurality of cell placements of the first portion of the cells, computing a per-rail power density value for each power supply rail within the first region;
    for each of the plurality of cell placements of the first portion of the cells, computing an overall rail power density for the first region based on the per-rail power density values;
    for each of the plurality of cell placements of the first portion of the cells, evaluating a cost function using a maximum of the per-rail power density values and the overall rail power density for the first region to generate an energy density; and
    selecting a cell placement of the plurality of cell placements associated with a minimum energy density compared with the energy densities for other cell placements in the plurality of cell placements.

2. The computer-implemented method of claim 1, wherein the energy density for the selected cell placement is lower compared with the energy density of the initial cell placement.

3. The computer-implemented method of claim 1, wherein obtaining the power density values comprises computing the power density value for each cell of the plurality of cells during a timing window as a function of an input slew rate and an output capacitance of the cell.

4. The computer-implemented method of claim 1, wherein computing the per-rail power density value for each power supply rail within the first region comprises summing the power density values for the cells in the first portion of the cells that are coupled to the power supply rail.

5. The computer-implemented method of claim 1, wherein the cost function is a sum of the per-rail power density values for the multiple power supply rails within the first region.

6. The computer-implemented method of claim 1, further comprising selecting the per-rail power density value for each power supply rail as a maximum of per-time slice rail power density values over multiple time slices.

7. The computer-implemented method of claim 1, wherein the overall rail power density is a sum of the per-rail power density values for the multiple power supply rails within the first region.

8. The computer-implemented method of claim 1, wherein at least one cell in the first portion of the cells has a fixed placement within the first region.

9. The computer-implemented method of claim 1, wherein the first portion of the cells includes cells of at least two sizes.

10. The computer-implemented method of claim 1, wherein the cost function is constrained so that each cell in the first portion of the cells occupies only one site within the first region and each site includes no more than one cell in the first portion of the cells.

11. The computer-implemented method of claim 1, wherein at least one of the steps of obtaining, computing the per-rail power density value, computing the overall rail power density, or evaluating is executed in parallel for at least one additional region of the multiple regions to produce an optimized cell placement for the integrated circuit layout.

12. The computer-implemented method of claim 11, wherein the optimized cell placement is subdivided into multiple second regions and the steps of computing the per-rail power density value, computing the overall rail power density, evaluating, and selecting are repeated for the second regions to produce a further optimized cell placement for the integrated circuit layout.

13. The computer-implemented method of claim 1, wherein at least one of the steps of obtaining, computing the per-rail power density value, computing the overall rail power density, evaluating, and selecting is performed on a server or in a data center, and the selected cell placement is streamed to a remote device.

14. The computer-implemented method of claim 1, wherein at least one of the steps of obtaining, computing the per-rail power density value, computing the overall rail power density, evaluating, and selecting is performed within a cloud computing environment.

15. The computer-implemented method of claim 1, wherein at least one of the steps of obtaining, computing the per-rail power density value, computing the overall rail power density, evaluating, and selecting is performed on a virtual machine comprising a portion of a graphics processing unit.

16. A system, comprising:
    a memory that stores power density values for a plurality of cells in an initial cell placement for an integrated circuit layout, wherein the initial cell placement is subdivided into multiple regions, and wherein at least a first region of the multiple regions includes multiple power supply rails and a first portion of the cells of the plurality of cells in the initial cell placement; and
    a processor that is connected to the memory, wherein the processor is configured to:
        for each of a plurality of cell placements of the first portion of the cells, compute a per-rail power density value for each power supply rail within the first region;

for each of the plurality of cell placements of the first portion of the cells, compute an overall rail power density for the first region based on the per-rail power density values;

for each of the plurality of cell placements of the first portion of the cells, evaluate a cost function using a maximum of the per-rail power density values and the overall rail power density for the first region to generate an energy density; and select a cell placement of the plurality of cell placements associated with a minimum energy density compared with the energy densities for other cell placements in the plurality of cell placements.

17. The system of claim 16, wherein the cost function is constrained so that each cell in the first portion of the cells occupies only one site within the first region and each site includes no more than one cell in the first portion of the cells.

18. The system of claim 16, wherein the processor computes the per-rail power density values and evaluates the cost function in parallel for at least one additional region of the multiple regions to produce an optimized cell placement for the integrated circuit layout.

19. A non-transitory computer-readable media storing computer instructions for producing an integrated circuit layout that, when executed by one or more processors, cause the one or more processors to perform the steps of:

obtaining power density values for a plurality of cells in an initial cell placement for an integrated circuit layout, wherein the initial cell placement is subdivided into multiple regions, and wherein at least a first region of the multiple regions includes multiple power supply rails and a first portion of the cells of the plurality of cells in the initial cell placement;

for each of a plurality of cell placements of the first portion of the cells, computing a per-rail power density value for each power supply rail within the first region based on the power density values of the first portion of the cells;

for each of the plurality of cell placements of the first portion of the cells, computing an overall rail power density for the first region based on the per-rail power density values;

for each of the plurality of cell placements of the first portion of the cells, evaluating a cost function using a maximum of the per-rail power density values and the overall rail power density for the first region to generate an energy density; and selecting a cell placement of the plurality of cell placements associated with a minimum energy density compared with the energy densities for other cell placements in the plurality of cell placements.

20. The non-transitory computer-readable media of claim 19, wherein the cost function is constrained so that each cell in the first portion of the cells occupies only one site within the first region and each site includes no more than one cell in the first portion of the cells.

21. A computer-implemented method, comprising:

obtaining power density values for a plurality of cells in an initial cell placement for an integrated circuit layout, wherein the initial cell placement is subdivided into multiple regions, and wherein at least a first region of the multiple regions includes multiple power supply rails and a first portion of the cells of the plurality of cells in the initial cell placement;

for each of a plurality of cell placements of the first portion of the cells, computing a per-rail power density value for each power supply rail within the first region;

for each of the plurality of cell placements of the first portion of the cells, computing an overall rail power density for the first region based on the per-rail power density values, wherein a location of at least one cell in the first portion of the cells is fixed at a placement position within the first region;

for each of the plurality of cell placements of the first portion of the cells, evaluating a cost function using a maximum of the per-rail power density values and the overall rail power density for the first region to generate an energy density; and selecting a cell placement of the plurality of cell placements, in response to the energy densities.

22. The computer-implemented method of claim 21, wherein the cost function is constrained so that each cell in the first portion of the cells occupies only one site within the first region and each site includes no more than one cell in the first portion of the cells.

23. The computer-implemented method of claim 21, wherein at least one of the steps of obtaining, computing the per-rail power density value, computing the overall rail power density, or evaluating is executed in parallel for at least one additional region of the multiple regions to produce an optimized cell placement for the integrated circuit layout.

* * * * *